(12) United States Patent
Goto et al.

(10) Patent No.: US 8,984,544 B2
(45) Date of Patent: Mar. 17, 2015

(54) DISK CONVEYING DEVICE

(71) Applicant: Sony Corporation, Tokyo (JP)

(72) Inventors: Naofumi Goto, Kanagawa (JP);
Takeharu Takasawa, Kanagawa (JP);
Takeshi Kubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/249,660

(22) Filed: Apr. 10, 2014

(65) Prior Publication Data
US 2014/0317643 A1    Oct. 23, 2014

(30) Foreign Application Priority Data

Apr. 17, 2013   (JP) .................................. 2013-086566

(51) Int. Cl.
G11B 17/04      (2006.01)
G11B 17/22      (2006.01)
(52) U.S. Cl.
CPC .................................... *G11B 17/225* (2013.01)
USPC ........................... 720/615; 720/633; 369/30.7
(58) Field of Classification Search
CPC .............. G11B 17/223; G11B 17/043; G11B 17/0438; G11B 33/08; G11B 17/30; G11B 11/10558; G11B 17/0434
USPC ................. 720/615, 632, 633, 634, 635, 657, 720/619–623; 369/30.64, 30.67, 30.68, 369/30.7, 30.75
See application file for complete search history.

(56) References Cited

U.S. PATENT DOCUMENTS

| | | | | |
|---|---|---|---|---|
| 5,602,695 A * | 2/1997 | Nishijima et al. | ............... | 360/94 |
| 5,822,149 A * | 10/1998 | Takase et al. | ................... | 360/94 |
| 5,917,795 A * | 6/1999 | Furukawa et al. | ............ | 720/635 |
| 7,444,650 B2 * | 10/2008 | Ito | ................. | 720/619 |
| 7,475,410 B2 * | 1/2009 | Matsuda et al. | ............ | 720/643 |
| 7,685,611 B2 * | 3/2010 | Tokita et al. | ................. | 720/615 |
| 7,777,984 B2 * | 8/2010 | Murase et al. | ................... | 360/85 |
| 8,281,327 B2 * | 10/2012 | Goto et al. | .................... | 720/615 |
| 8,356,312 B2 * | 1/2013 | Takasawa et al. | ............ | 720/615 |
| 8,607,254 B2 * | 12/2013 | Takasawa et al. | ............ | 720/632 |
| 8,701,131 B2 * | 4/2014 | Goto et al. | .................... | 720/615 |
| 8,793,712 B2 * | 7/2014 | Goto et al. | .................... | 720/615 |
| 2011/0296446 A1 * | 12/2011 | Takasawa et al. | ............ | 720/621 |

* cited by examiner

*Primary Examiner* — Brian Miller
(74) *Attorney, Agent, or Firm* — Wolf, Greenfield & Sacks, P.C.

(57) ABSTRACT

Provided is a disk conveying device including a conveying mechanism configured to convey a disk recording medium inside and outside a disk cartridge including a plurality of holding grooves into which both end portions of the disk recording medium positioned at opposite sides with a center hole interposed therebetween are inserted, the plurality of holding grooves being formed in a line in a thickness direction of the disk recording medium, and a discharge lever configured to press an outer circumferential surface of the disk recording medium to the disk cartridge side when the disk recording medium is conveyed by the conveying mechanism.

6 Claims, 35 Drawing Sheets

FIG.6
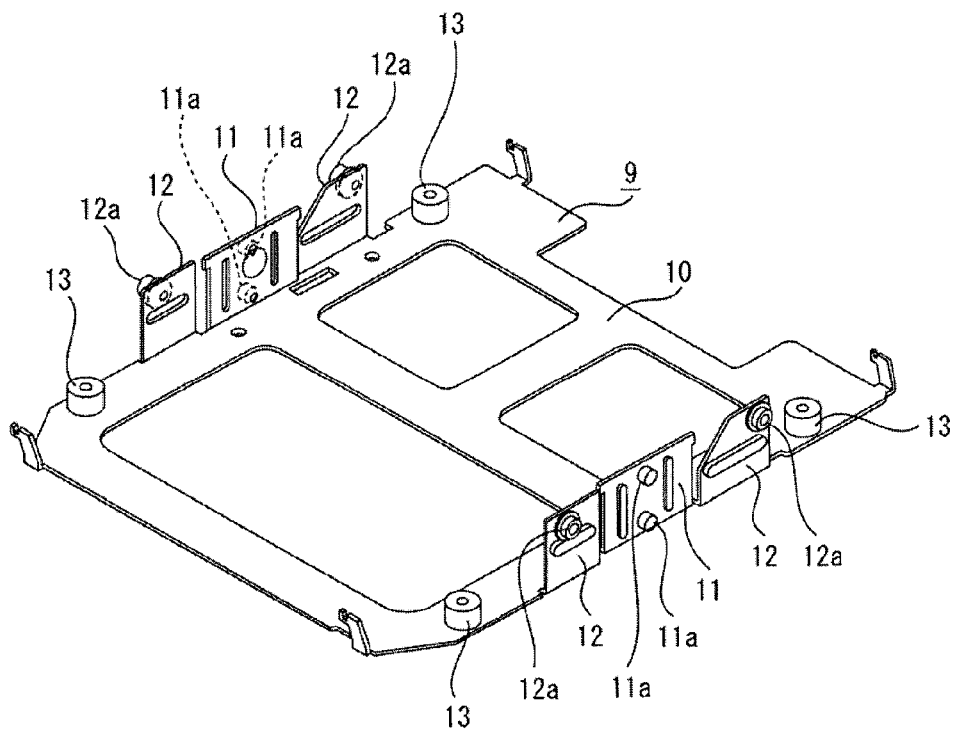
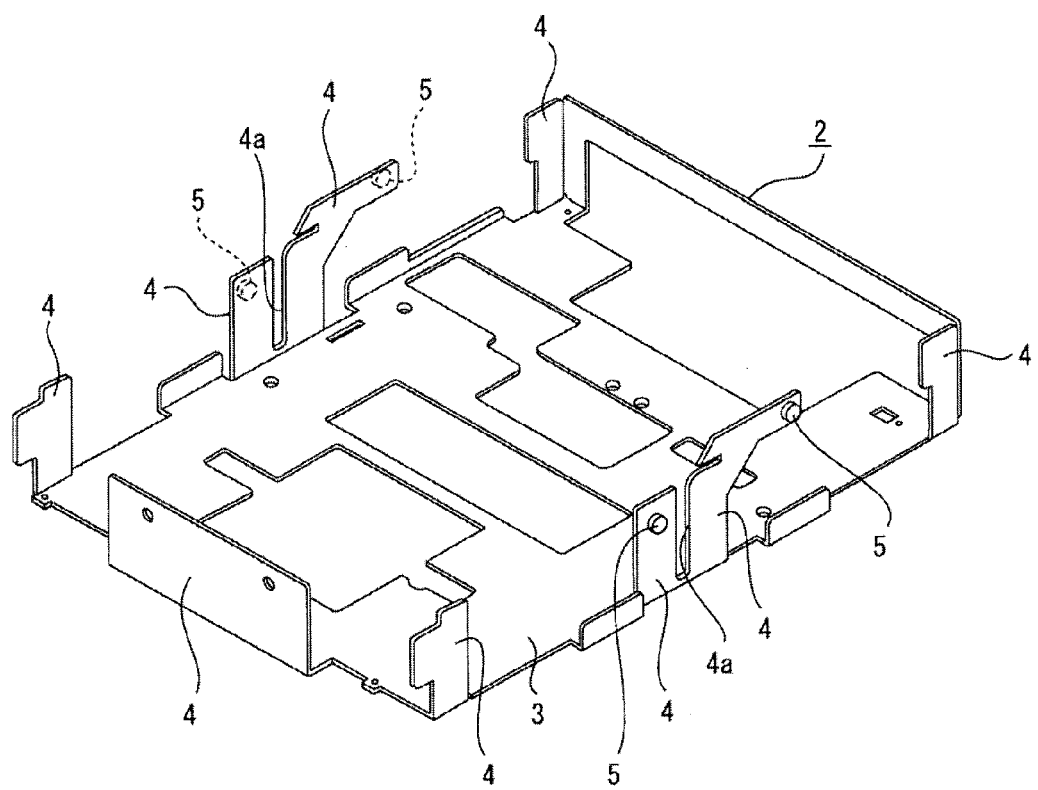

DISK CONVEYING DEVICE

CROSS REFERENCE TO RELATED APPLICATIONS

This application claims the benefit of Japanese Priority Patent Application JP 2013-086566 filed Apr. 17, 2014, the entire contents of which are incorporated herein by reference.

BACKGROUND

The present technology relates to the technical field of a disk conveying device that conveys a disk-like recording medium between a storage position at which the disk-like recording medium is stored in a disk cartridge and a recording and reproduction position at which recording or reproduction of an information signal is performed on the disk-like recording medium extracted from the disk cartridge.

There is a disk conveying device that conveys a disk-like recording medium between a recording and reproduction position at which recording or reproduction of an information signal such as image data or audio data is performed on the disk-like recording medium and a storage position at which the disk-like recording medium is stored in a disk cartridge. A plurality of disk-like recording media are stored in the disk cartridge in line in a thickness direction.

For example, there is a disk conveying device configured such that a desired disk-like recording medium is extracted from a storage position from among a plurality of disk-like recording media stored in a disk cartridge and conveyed up to a recording and reproduction position by a conveying mechanism, and a disk-like recording medium in which recording or reproduction of an information signal has ended is conveyed from the recording and reproduction position to the storage position by the conveying mechanism (for example, see JP 2012-243335A and JP 2012-104203A).

In the disk conveying device disclosed in JP 2012-243335A, the conveying mechanism is provided with a pair of pivoting arms and a plurality of conveying rollers that hold the disk-like recording medium from the outer circumferential side, and as the pivoting arm pivots in the state in which the disk-like recording medium is held by the conveying roller, the disk-like recording medium is conveyed between the storage position and the recording and reproduction position.

In the disk conveying device disclosed in JP 2012-104203A, the conveying mechanism is provided with a plurality of feeding rollers that pinch the disk-like recording medium in the thickness direction, and as the feeding rollers pinching and holding the disk-like recording medium pivot, the disk-like recording medium is conveyed between the storage position and the recording and reproduction position.

SUMMARY

Meanwhile, in the disk conveying device disclosed in JP 2012-243335A, for example, since the disk-like recording medium is held by only the two conveying rollers when stored in the disk cartridge, the disk-like recording medium is likely to be slanted in the thickness direction.

Further, in the disk conveying device disclosed in JP 2012-104203A, for example, since the disk-like recording medium is held by only the two feeding rollers when stored in the disk cartridge, the disk-like recording medium is likely to be slanted in the thickness direction.

When the disk-like recording medium is slanted in the thickness direction as described above, an end portion of a side to which the disk-like recording medium is slanted is likely to come into contact with another disk-like recording medium already stored in the disk cartridge, and thus the disk-like recording medium is likely to be scratched or damaged.

Particularly, when the disk cartridge is miniaturized and so the distance (pitch) between the disk-like recording media in the disk cartridge in the thickness direction decreases, the disk-like recording media easily come into contact with each other.

It is desirable to provide a disk conveying device which is capable of regulating an inclination of a disk-like recording medium at the time of conveyance and preventing the disk-like recording medium from being scratched and damaged.

According to an embodiment of the present disclosure, there is provided a disk conveying device, including a conveying mechanism configured to convey a disk-like recording medium inside and outside a disk cartridge including a plurality of holding grooves into which both end portions of the disk-like recording medium positioned at opposite sides with a center hole interposed therebetween are inserted, the plurality of holding grooves being formed in a line in a thickness direction of the disk-like recording medium, and a discharge lever configured to press an outer circumferential surface of the disk-like recording medium to the disk cartridge side when the disk-like recording medium is conveyed by the conveying mechanism. The disk-like recording medium is conveyed between a storage position at which the both end portions are inserted into the holding groove and the disk-like recording medium is stored in the disk cartridge and a recording and reproduction position at which recording or reproduction of an information signal is performed on the disk-like recording medium extracted from the disk cartridge, and at least a holding lever is provided, the holding lever being configured to come into contact with an outer circumferential portion of the disk-like recording medium, hold the disk-like recording medium, and regulate an inclination of the disk-like recording medium in the thickness direction of the disk-like recording medium when the disk-like recording medium is conveyed from the recording and reproduction position to the storage position.

Thus, when the disk-like recording medium is conveyed by the conveying mechanism, the holding lever comes into contact with the outer circumferential portion of the disk-like recording medium, and an inclination of the disk-like recording medium in the thickness direction is regulated.

According to an embodiment of the present disclosure, the disk conveying device may further include an urging spring configured to urge the holding lever to press the outer circumferential portion of the disk-like recording medium.

Thus, when the disk-like recording medium is conveyed, the holding lever comes into close contact with the outer circumferential surface of the disk-like recording medium.

According to an embodiment of the present disclosure, the holding lever may be configured to pivot in a plane perpendicular to the thickness direction of the disk-like recording medium, and the holding lever may pivot according to a conveyance position of the disk-like recording medium in a state in which the holding lever presses the outer circumferential surface of the disk-like recording medium.

Thus, a load applied to the disk-like recording medium from the holding lever is reduced.

According to an embodiment of the present disclosure, the holding lever may be provided with an arm portion and a roller portion configured to be rotatably supported on one end portion of the arm portion and come into contact with the outer circumferential portion of the disk-like recording medium.

Thus, when the disk-like recording medium is conveyed, the roller portion presses the disk-like recording medium while rotating.

According to an embodiment of the present disclosure, flange portions may be provided on both end portions of the roller portion in an axial direction. A portion between the flange portions may be provided as a contact portion having a cylindrical shape that comes into contact with the outer circumferential surface of the disk-like recording medium.

Thus, the flange portions are positioned on both sides of the disk-like recording medium in the thickness direction.

According to an embodiment of the present disclosure, the disk conveying device may further include a route guide configured to guide the disk-like recording medium whose outer circumferential portion is inserted into the route guide at a time of conveyance. A storage concave portion is formed in the route guide, and when the disk-like recording medium may be guided to the route guide, at least a part of the holding lever is stored in the storage concave portion. Thus, the route guide does not interfere with the holding lever.

According to one or more of embodiments of the present technology, an inclination of the disk-like recording medium is regulated at the time of conveyance, and when the disk-like recording medium is stored in the disk cartridge, the disk-like recording medium to be stored is prevented from coming into contact with the disk-like recording medium already stored in the disk cartridge, and thus it is possible to prevent the disk-like recording medium from being scratched and damaged.

BRIEF DESCRIPTION OF THE DRAWINGS

FIG. 6 is a perspective view illustrating a base frame and a base plate;

FIG. 19 is a schematic side view illustrating an initial state of a unit plate and the like;

DETAILED DESCRIPTION OF THE EMBODIMENT(S)

Figure 1:
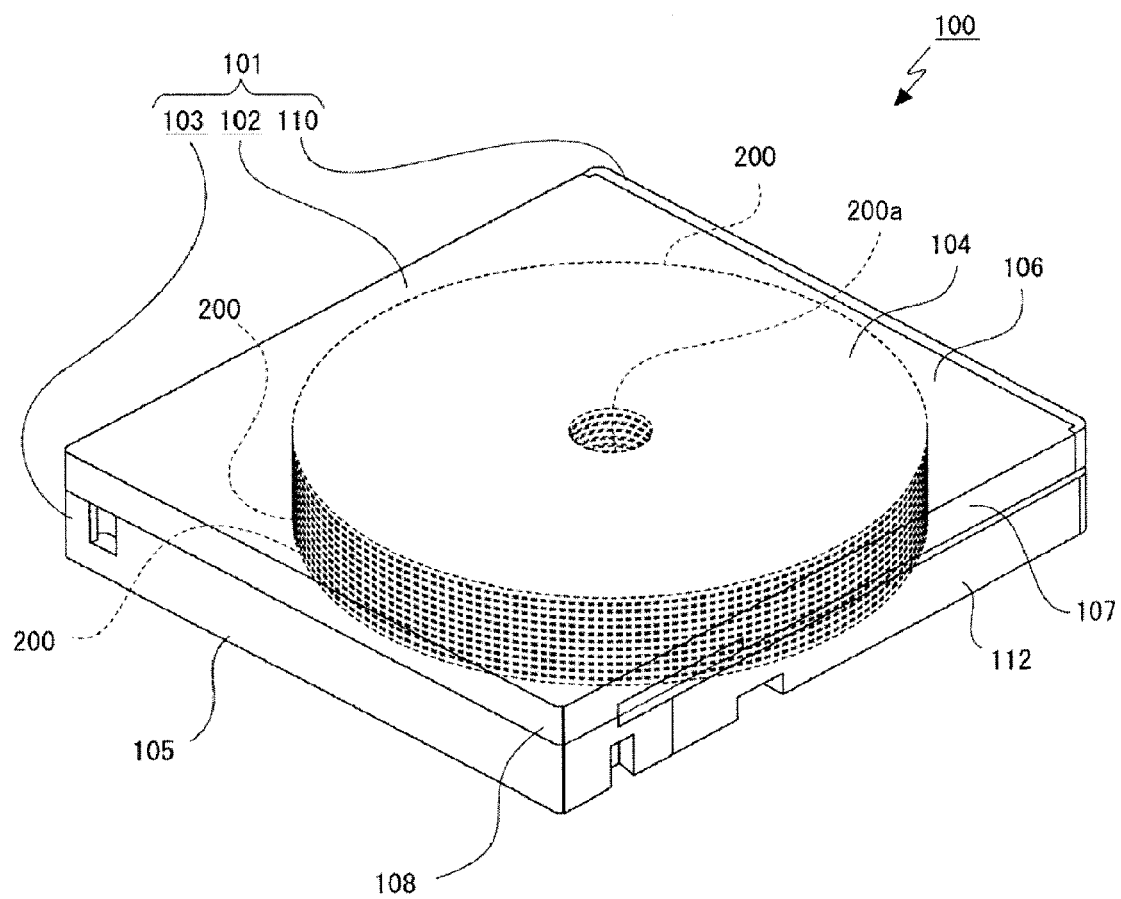
FIG. 1 illustrates an embodiment of a disk conveying device according to an embodiment of the present technology together with FIGS. 2 to 36, and is a perspective view of a disk cartridge in which a disk-like recording medium conveyed by the disk conveying device is stored.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an exemplary embodiment of a disk conveying device according to an embodiment of the present technology will be described with reference to the appended drawings. A disk conveying device has a function of conveying a disk-like recording medium between a storage position at which the disk-like recording medium is stored in a disk cartridge and a recording and reproduction position at which recording or reproduction of an information signal is performed on the disk-like recording medium extracted from the disk cartridge.

In the following description, front, back, up, down, left, and right directions are defined as follows. A direction in which the disk-like recording medium is conveyed from the storage position to the recording and reproduction position is referred to as a "back direction (retraction direction)," a direction in which the disk-like recording medium is conveyed from the recording and reproduction position to the storage position is referred to as a "front direction (discharge direction)," and left and right directions are determined when viewing in the back direction from the front.

Here, the front, back, up, down, left, and right directions described below are for convenience of description, and an implementation of the present technology is not limited to these directions.

[Configuration of Disk Cartridge]

First, a configuration of a disk cartridge will be described (see FIGS. 1 and 2).

A disk cartridge 100 is configured such that necessary components are arranged in a case body 101, and a case body 101 includes a first shell 102 and a second shell 103. A plurality of disk-like recording media 200 can be stored at equal intervals vertically in the case body 101.

For example, the first shell 102 and the second shell 103 can be vertically combined with or separated from each other.

The first shell 102 is such that a base body 104 is vertically combined with an auxiliary base 105 attached to a rear end portion of the base body 104.

The base body 104 includes a base surface portion 106 facing up and down, side surface portions 107 protruding downwards from both left and right end portions of the base surface portion 106, and a rear surface portion 108 protruding downwards from the rear end portion of the base surface portion 106.

A center pin 109 having a vertically protruding cylindrical shaft shape is disposed in the central portion of the base surface portion 106.

An opening/closing panel 110 is attached to a front end portion of the first shell 102.

The second shell 103 is configured such that a base portion 111 facing up and down is integrated with side portions 112 protruding upwards from left and right end portions of the base portion 111.

Holding grooves 112a are formed in the side portion 112, and the holding grooves 112a are vertically positioned at equal intervals from each other.

A bridge member 113 is attached at the position near the rear end between the side portions 112 of the second shell 103. The bridge member 113 regulates bending of the side portions 112.

In the disk cartridge 100 having the above configuration, the disk-like recording media 200 are held in the case body 101. In the state in which the first shell 102 is separated from the second shell 103, the disk-like recording media 200 are inserted into the holding grooves 112a formed on the side portions 112 of the second shell 103 in the back direction through the outer circumferential portion, and the outer circumferential portion is held in the case body 101. Thus, an opening portion positioned at the rear end of the second shell 103 is formed as a disk inserting/removing port 103a through which the disk-like recording media 200 are inserted into or removed from the second shell 103.

The first shell 102 and the second shell 103 of the disk cartridge 100 are combined in the state in which the base surface portion 106 of the base body 104 vertically faces the base portion 111 (see FIG. 1). In the state in which the first shell 102 is combined with the second shell 103, the first shell 102 and the second shell 103 are locked by a lock mechanism (not shown).

In the state in which the first shell 102 is combined with the second shell 103, the center pin 109 formed in the first shell 102 is inserted into the center holes 200a of the disk-like recording media 200, and thus the positions of the disk-like recording media 200 are aligned.

Figure 2:
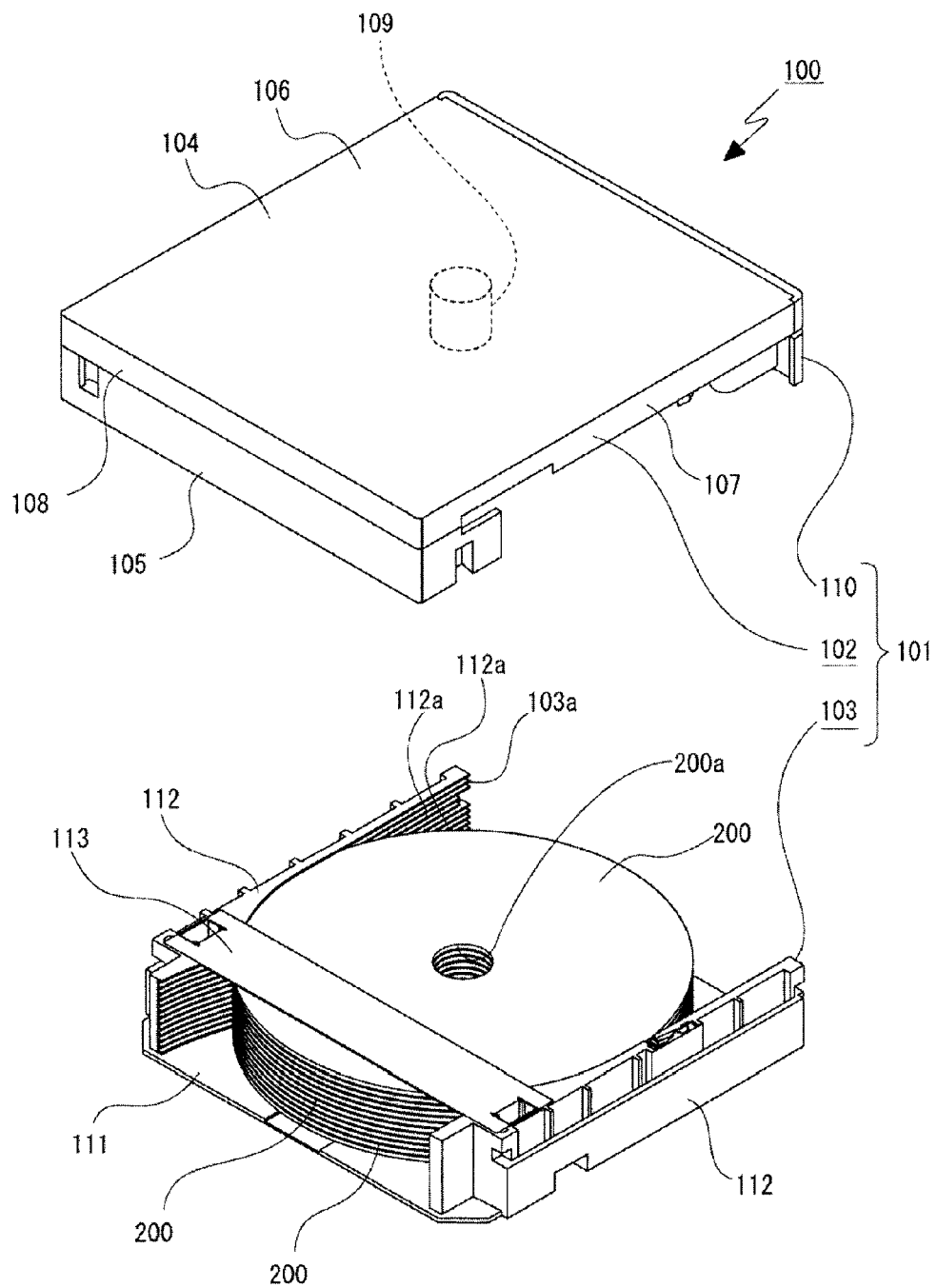
FIG. 2 is a perspective view of a disk cartridge represented by a state in which a first shell is separated from a second shell.

The first shell 102 and the second shell 103 can be separated from each other as the disk cartridge 100 is unlocked by the lock mechanism (see FIG. 2). As the first shell 102 and the second shell 103 are separated from each other, the disk inserting/removing port 103a of the second shell 103 is opened, and thus the disk-like recording media 200 can be stored in or extracted from the disk cartridge 100 through the disk inserting/removing port 103a.

[Overall Configuration of Disk Storage System]

Next, an overall configuration of a disk storage system 150 in which the disk cartridge 100 is used will be described (see FIGS. 3 and 4).

The disk storage system 150 includes the disk cartridge 100, a disk changer 160 in which the disk cartridge 100 is held, and a disk conveying device 1 that conveys the disk-like recording media 200.

A lifting mechanism (not shown) and a cartridge holder (not shown) that is moved vertically by the lifting mechanism are disposed in the disk changer 160, and the disk cartridge 100 is held in the cartridge holder.

Figure 3:
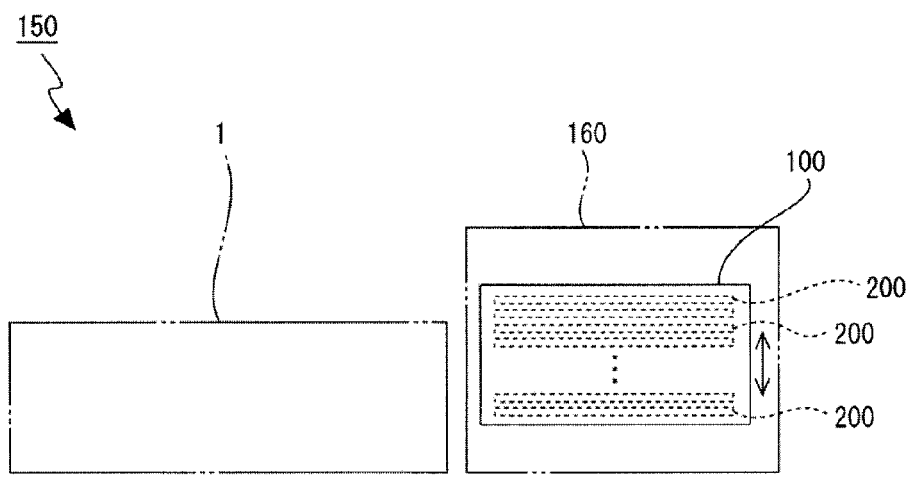
FIG. 3 illustrates a disk storage system in which a disk conveying device is installed together with FIG. 4, and is a schematic side view illustrating a state in which a disk-like recording medium is stored in a disk cartridge.
Figure 4:
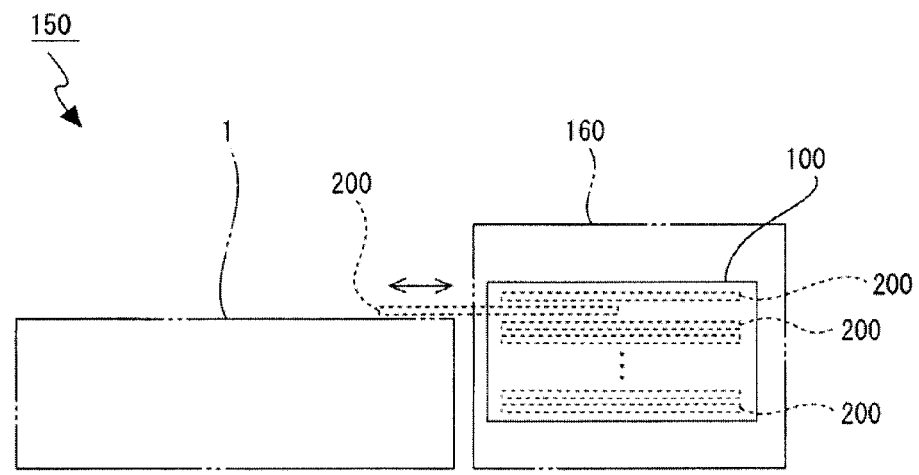
FIG. 4 is a schematic side view illustrating a state in which a disk-like recording medium is transferred between a disk cartridge and a disk conveying device.

The disk cartridge 100 moves vertically together with the cartridge holder through the lifting mechanism (see FIG. 3). Between the disk cartridge 100 and the disk conveying device 1, the disk-like recording medium 200 is transferred in a direction (a front or back direction) perpendicular to the central axis direction.

The disk-like recording medium 200 is extracted from the disk cartridge 100 in the back direction by an extraction mechanism (not shown) disposed in the disk changer 160, conveyed up to the recording and reproduction position in the back direction by the disk conveying device 1 (see FIG. 4), and an information signal is recorded or reproduced. The disk-like recording medium 200 in which recording or reproduction of the information signal has ended is conveyed up to the storage position in the front direction by the disk conveying device 1 (see FIG. 4), and stored in the disk cartridge 100.

[Configuration of Disk Conveying Device]

Next, a configuration of the disk conveying device 1 will be described (see FIGS. 5 to 17).

<Base Frame>

Figure 5:
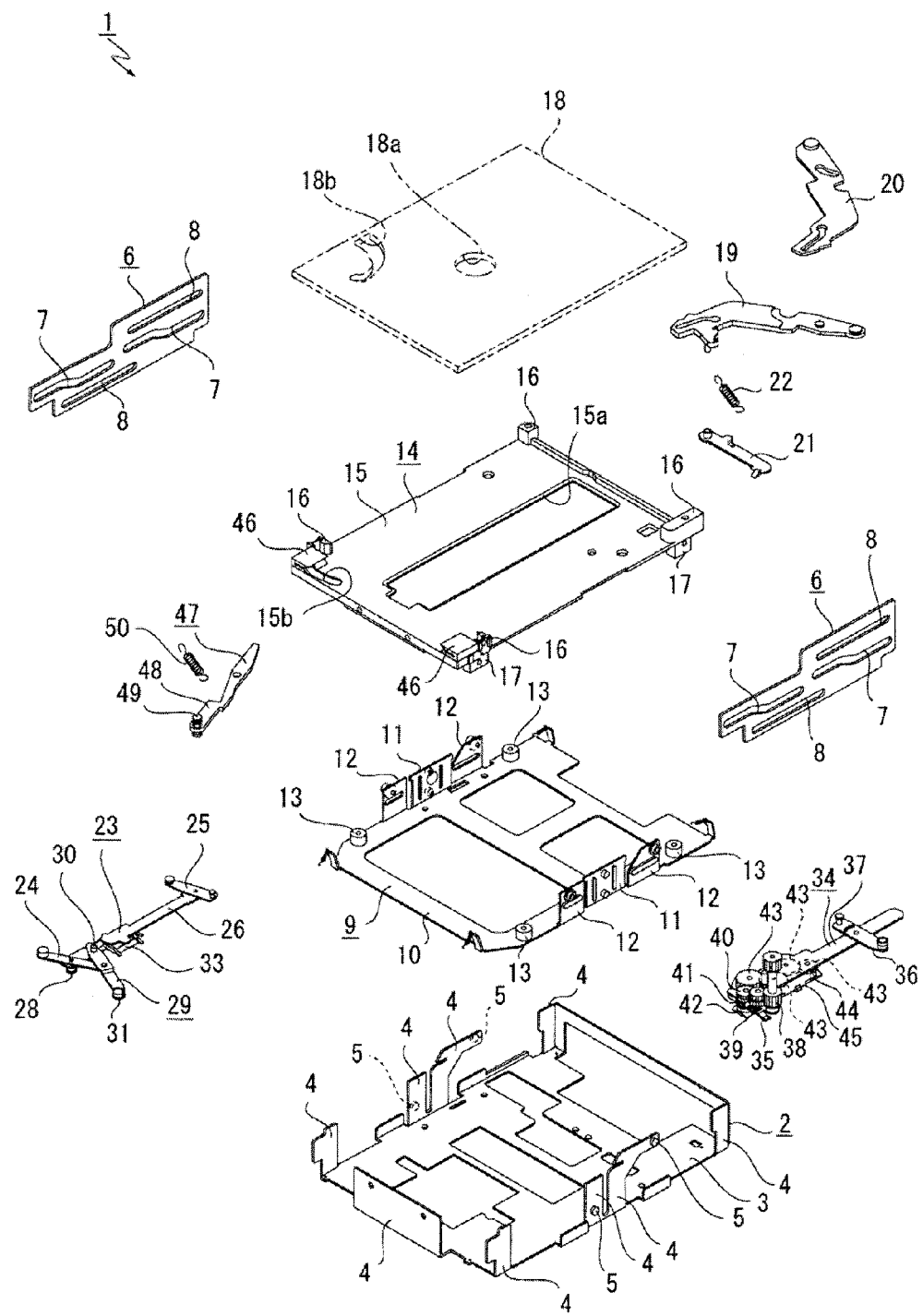
FIG. 5 is an exploded perspective view of a disk conveying device.
Figure 7:
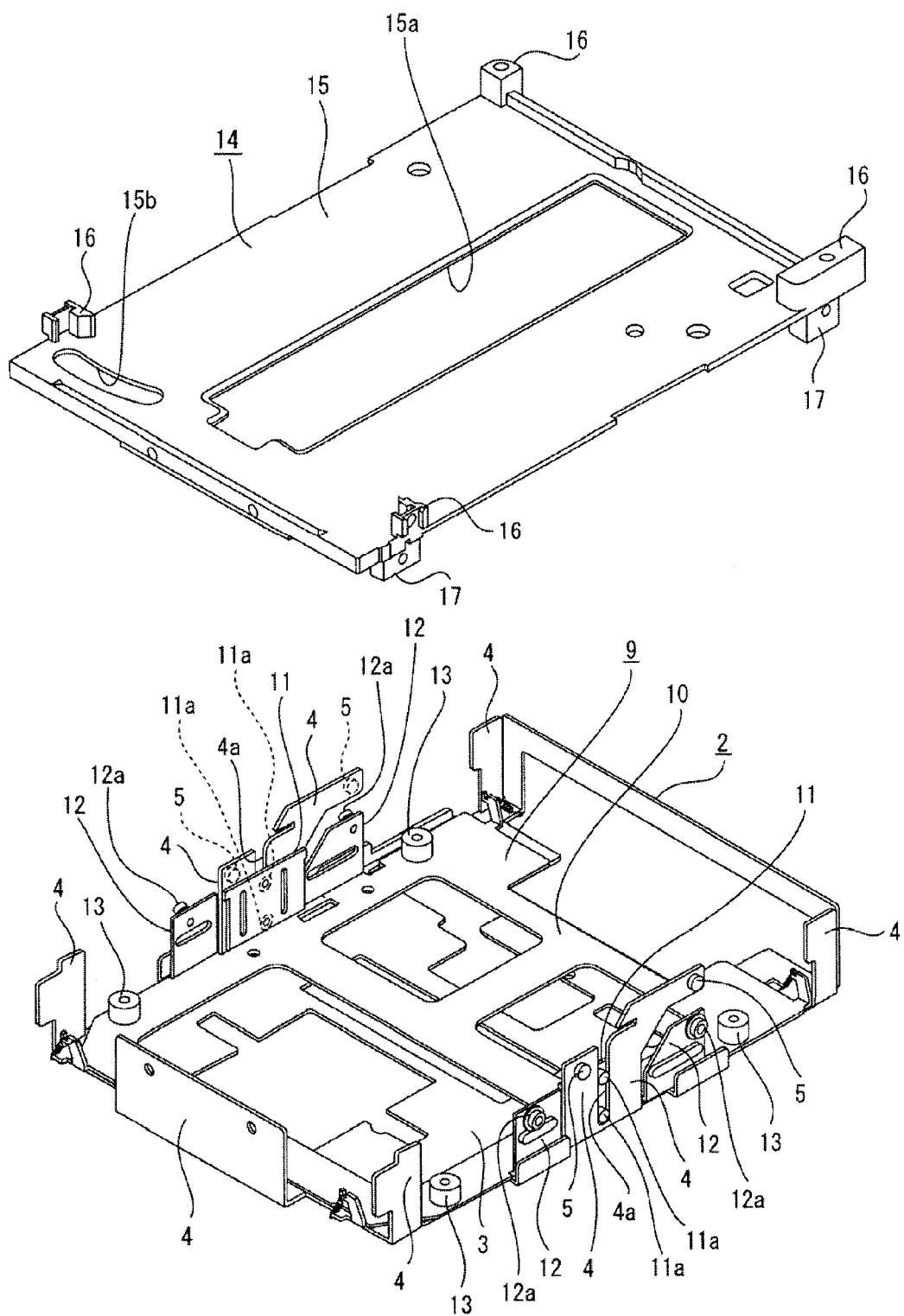
FIG. 7 is a perspective view illustrating a base frame, a unit plate, and a base plate.

The disk conveying device 1 includes a base frame 2 and a cover (not shown) that covers the base frame 2 from the upper side, and the base frame 2 includes a bottom plate portion 3 formed in an approximately longitudinal rectangular shape and a plurality of side plate portion 4s protruding upward from an outer circumferential edge of the bottom plate portion 3 (see FIGS. 5 to 7).

Two side plate portions 4 are disposed in line on each of left and right sides of the approximately central portion of the base frame 2 in the front to back direction. A slit that is opened upward and extends vertically is formed between the lined-up side plate portions 4, and the slit is formed as a guide regulating hole 4a.

Guide regulating pins 5 are attached to the outer surfaces of the lined-up pairs of side plate portions 4 on the approximately central portion in the front to back direction.

A circuit substrate (not shown) is arranged on the bottom plate portion 3 of the base frame 2.

<Side Slider>

Figure 8:
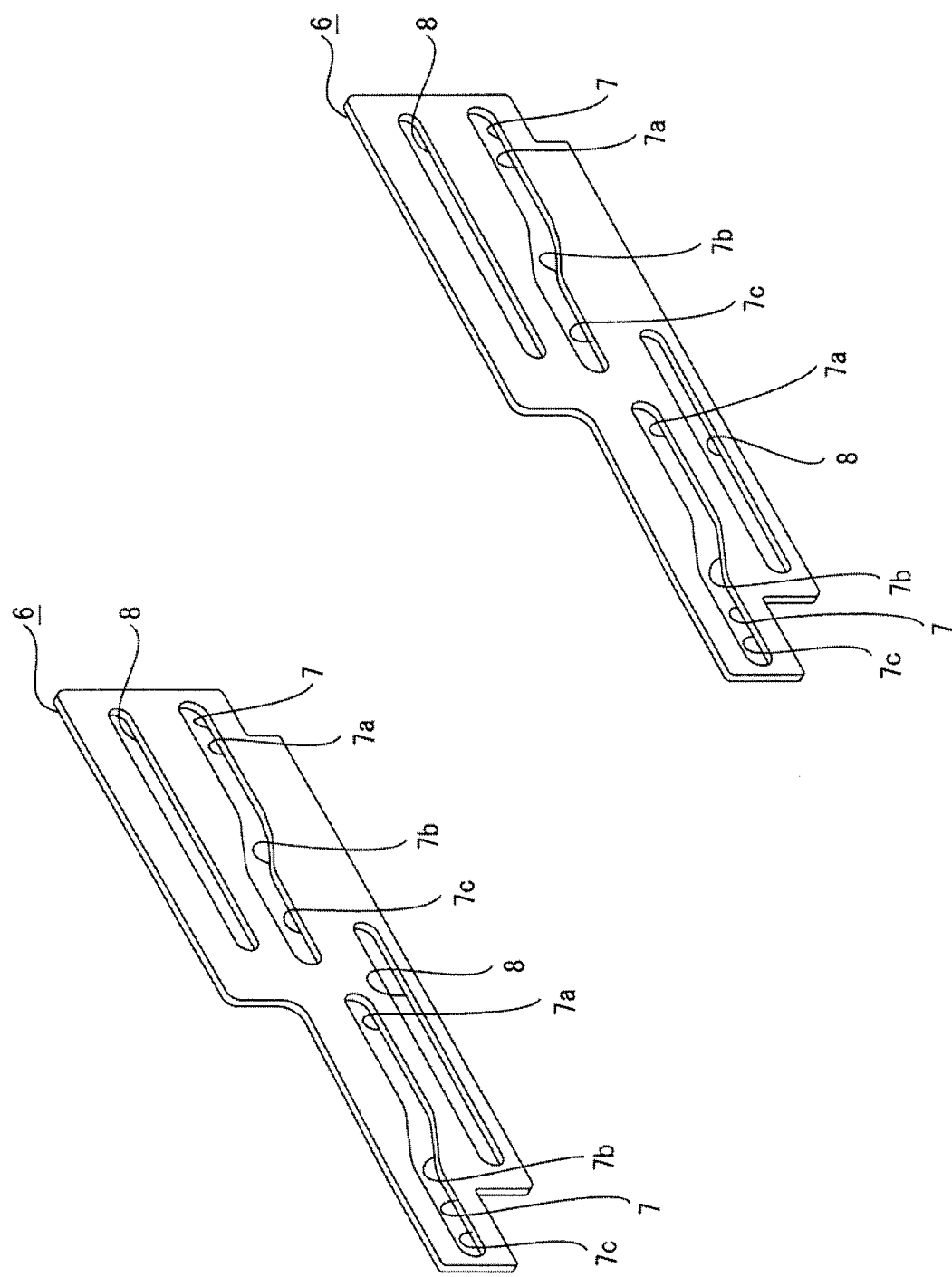
FIG. 8 is a perspective view illustrating a side slider.
Figure 9:
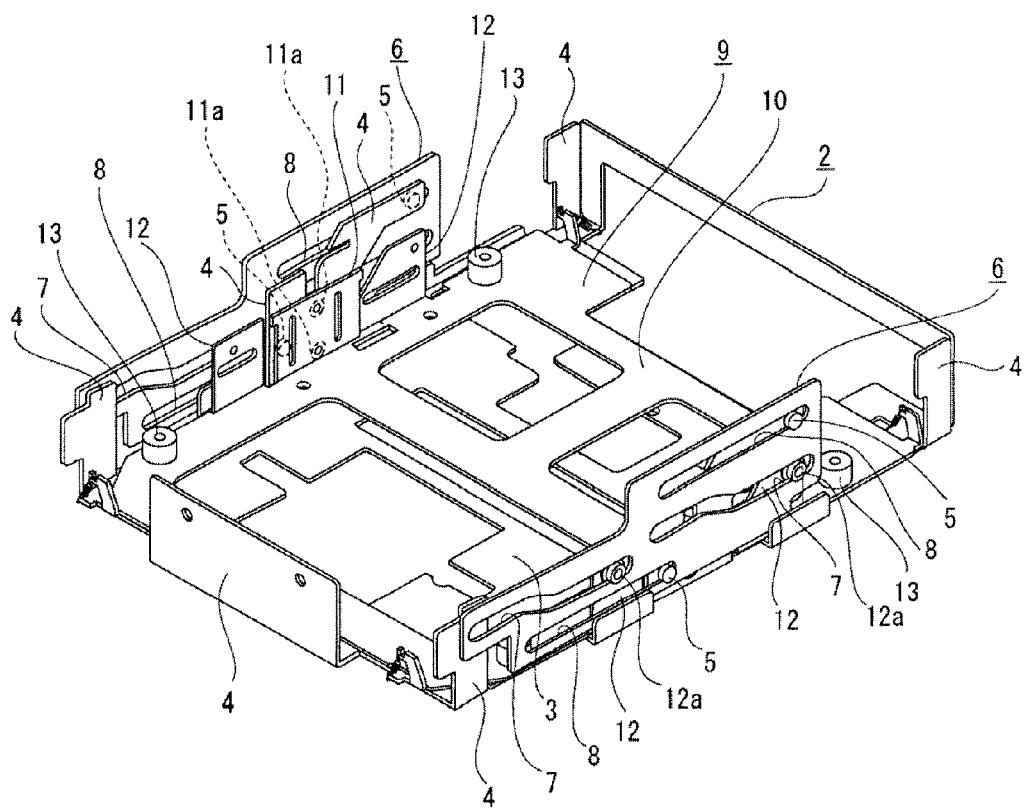
FIG. 9 is a perspective view illustrating a base frame, a unit plate, and a side slider.

Side sliders 6 are supported by the side plate portions 4 of the base frame 2 to be removable in the front to back direction in the state in which the side sliders 6 are horizontally separated from each other (see FIGS. 8 and 9). The side slider 6 is formed in a plate shape facing left and right and moves in the front and back directions by a drive mechanism (not shown) including a cam slider.

Lifting cam holes 7 are formed apart from each other on the side slider 6. The lifting cam holes 7 includes rear cam portions 7a extending in the front to back direction, inclined cam portions 7b that is in front of the rear cam portion 7a and displaced upward while extending in the front direction, and a front cam portion 7c that is in front of the inclined cam portion 7b and extends in the front to back direction.

In the side slider 6, guide holes 8 extending in the front to back direction are formed below the lifting cam hole 7 at the front side and above the lifting cam hole 7 at the rear side.

As the guide regulating pins 5 of the base frame 2 are inserted into the guide holes 8, the side slider 6 is supported on the base frame 2 to be movable in the front and back directions (see FIG. 9).

<Unit Plate, Base Unit, and so on>

A unit plate 9 is supported by the side sliders 6 to be vertically movable (see FIGS. 6 and 7).

The unit plate 9 includes a base surface portion 10 facing up and down, first side surface portions 11 protruding upward from both left and right edges of the base surface portion 10, and second side surface portions 12 protruding upward from both left and right edges of the base surface portion 10.

The base surface portion 10 is formed in an approximately longitudinal rectangular shape.

The first side surface portion 11 is positioned slightly inside the second side surface portion 12, and guided pins 11a are formed apart from each other vertically on the outer surface of the first side surface portion 11. The guided pins 11a are slidably engaged with the guide regulating hole 4a formed between the side plate portions 4 of the base frame 2, and thus movement of the unit plate 9 in the left and right directions by the base frame 2 is regulated.

The second side surface portions 12 are positioned in the front to back direction with the first side surface portions 11 interposed therebetween. A guided pin 12a is formed on the outer surface of the second side surface portion 12. The guided pin 12a is slidably engaged with the lifting cam hole 7 of the side slider 6, and thus the unit plate 9 is supported on the side sliders 6 to be vertically movable.

As the side sliders 6 move in the front and back directions, the guided pins 11a are guided to the guide regulating hole 4a of the base frame 2, the guided pin 12a slides to the lifting cam hole 7 of the side slider 6, and the unit plate 9 moves vertically.

Dampers 13 are formed apart from each other horizontally and longitudinally on the base surface portion 10, and a base unit (not shown) is attached to the base surface portion 10 through the dampers 13. The base unit includes a disk table on which the disk-like recording medium 200 is mounted, a spindle motor that rotates the disk table, an optical pickup that moves in the radial direction of the disk-like recording medium 200, and the like.

As the unit plate 9 moves, the base unit moves vertically, and the disk table is separated from or comes into contact with a chucking pulley which will be described later.

<Base Plate>

In the base frame 2, a base plate 14 is attached to the upper end portion of the side plate portions 4 (see FIG. 7). The base plate 14 includes a base plate portion 15 formed in an approximately longitudinal rectangular shape, attached protrusion portions 16 protruding downwards from the outer circumferential portion of the base plate portion 15, and attaching protrusion portions 17 protruding upward from the outer circumferential portion of the base plate portion 15. In the base plate 14, the attached protrusion portions 16 are attached to the side plate portions 4 of the base frame 2 by screws or the like. The base plate portion 15 is positioned above the bottom plate portion 3.

A base unit insertion hole 15a extending in the front to back direction is formed in the central portion of the base plate portion 15 in the left to right direction. A roller insertion hole 15b is formed in the left end portion of the base plate portion 15 in the front end portion, and the roller insertion hole 15b is formed in a gentle circular arc shape extending in the approximately horizontal direction.

<Base Chassis>

A base chassis 18 is attached to the base plate 14 (see FIG. 5). The base chassis 18 is formed in an approximately longitudinal rectangular shape, and the outer circumferential portion thereof is attached to the attaching protrusion portions 17 of the base plate 14.

A pulley support hole 18a is formed in the approximately central portion of the base plate 14, and the chucking pulley (not shown) is rotatably supported by the pulley support hole 18a. A cam hole 18b of an approximately circular arc shape is formed in the left end portion of the front end portion of the base plate 14. A plurality of lever support portions and an insertion hole are formed in the base plate 14.

<Interlocking Lever>

Figure 10:
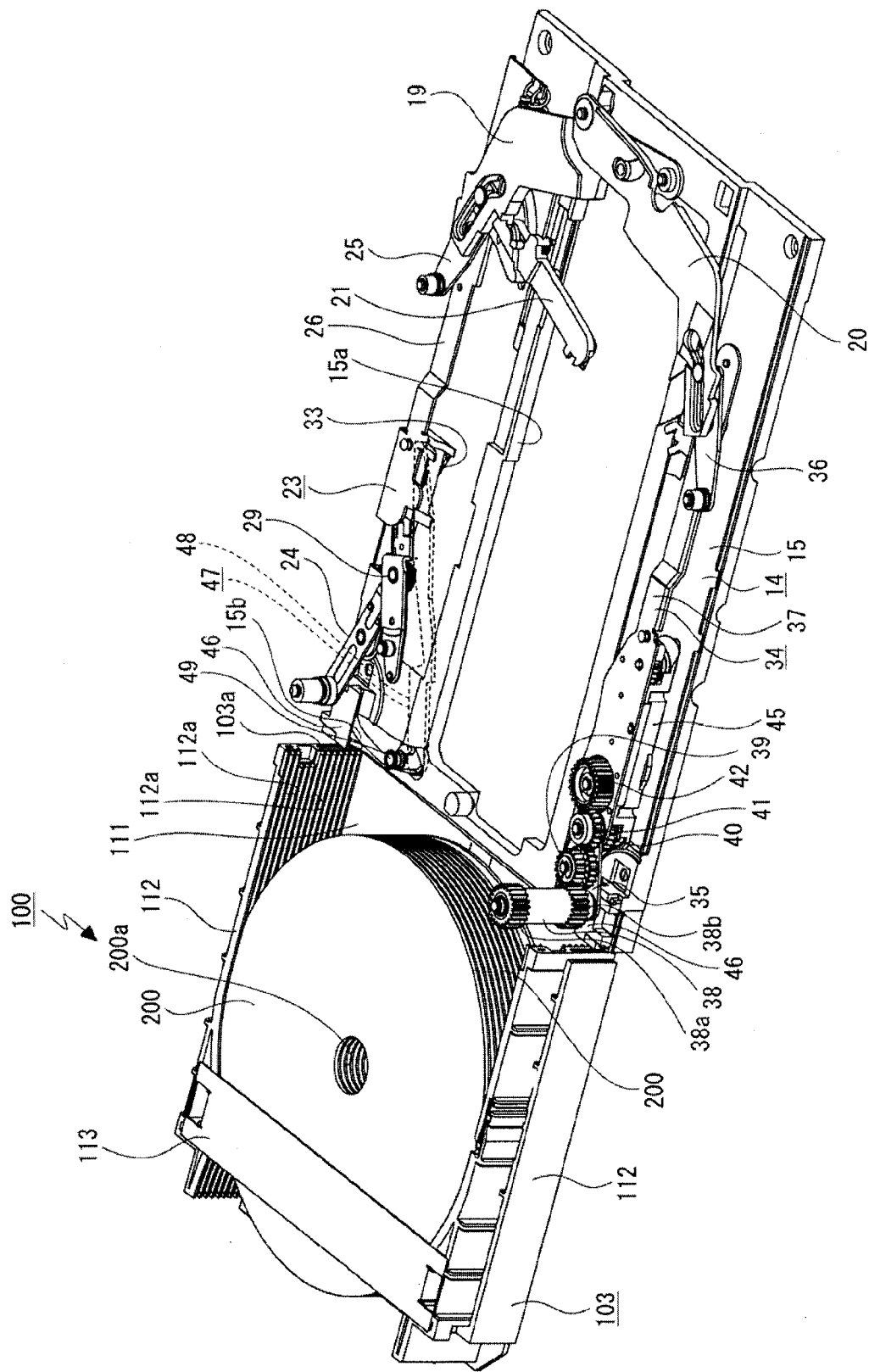
FIG. 10 is a perspective view illustrating a disk cartridge and a disk conveying device.
Figure 11:
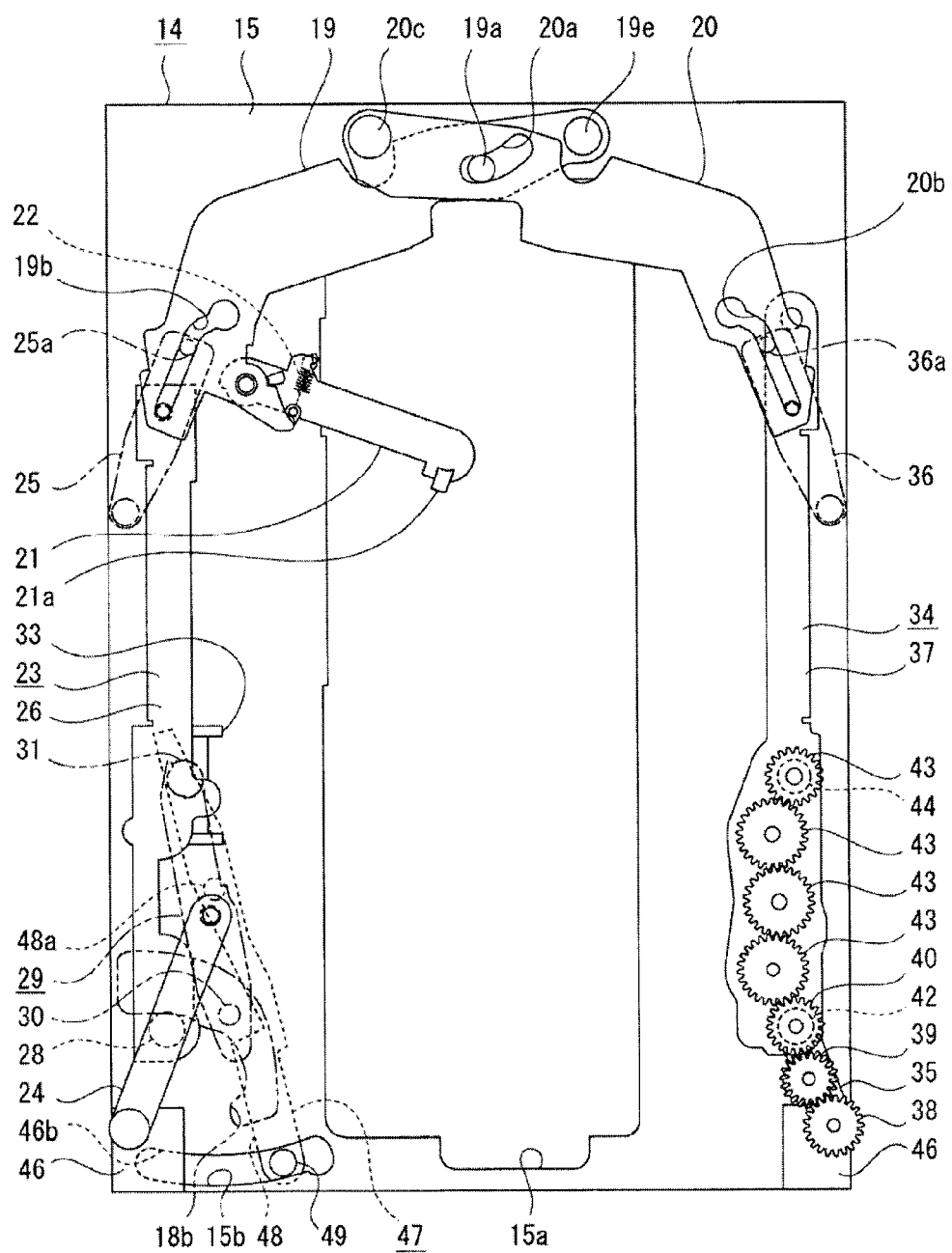
FIG. 11 is a schematic plane view illustrating mechanisms installed in a disk conveying device.
Figure 12:
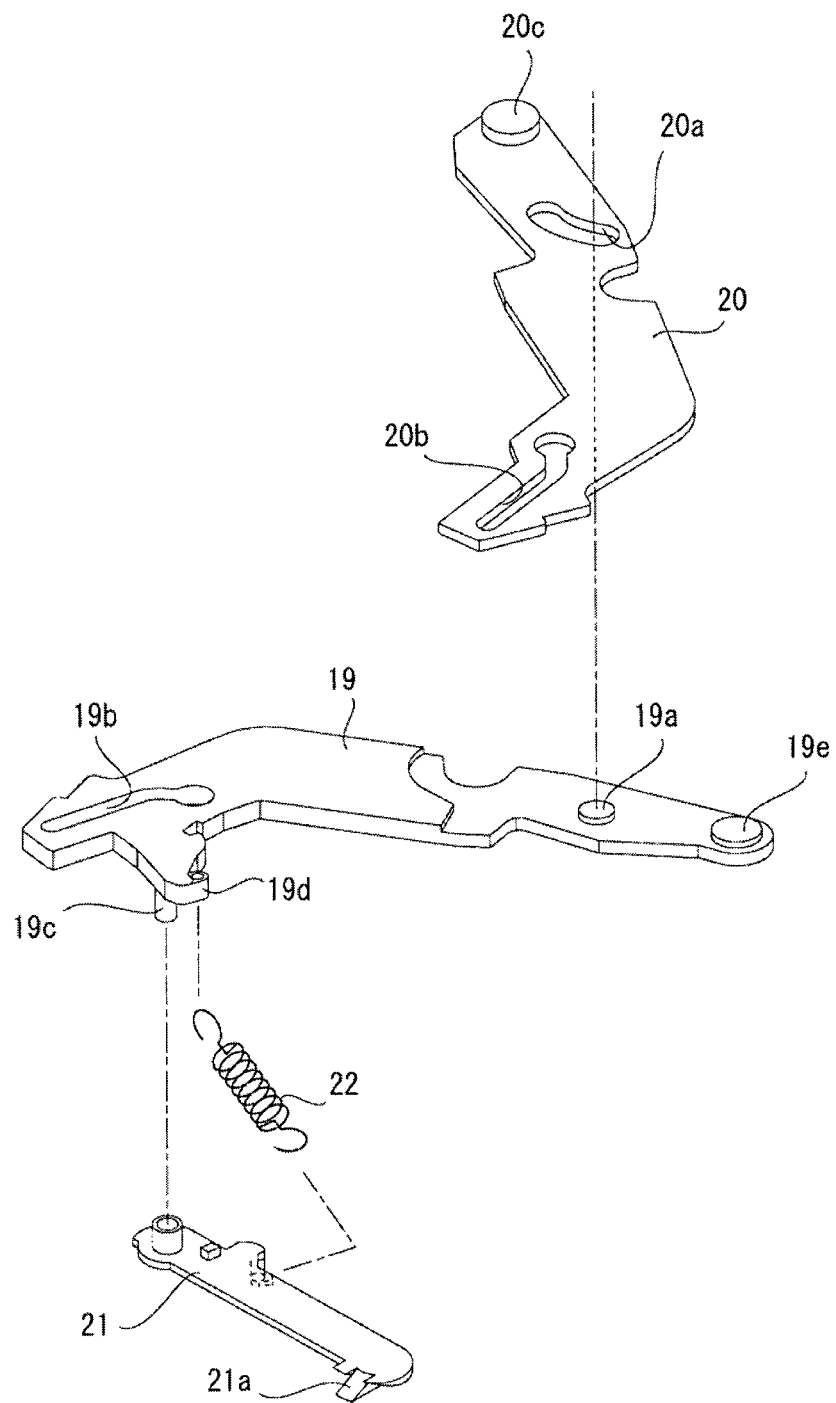
FIG. 12 is an exploded perspective view illustrating an interlocking lever and a start lever.

A first interlocking lever 19 and a second interlocking lever 20 are pivotally supported on the base chassis 18 at the position near the rear end of the upper surface side in the coupled state (see FIGS. 10 to 12).

The first interlocking lever 19 is formed in a plate shape facing up and down and has a reversed V shape that curves upward. In the first interlocking lever 19, a coupling shaft 19a protruding upward is formed at the position near the right end, and an engaging hole 19b of an approximately circular arc shape is formed at the left end portion (see FIG. 12). In the first interlocking lever 19, a support shaft 19c protruding downward is formed between the engaging hole 19b and the coupling shaft 19a. In the first interlocking lever 19, a spring engaging portion 19d protruding to the side is formed at the position opposite to the engaging hole 19b with the support shaft 19c interposed therebetween.

A support point portion 19e serving as a pivot support point with respect to the base chassis 18 is formed in the right end portion of the first interlocking lever 19.

The second interlocking lever 20 is formed in a plate shape facing up and down and has a V shape that curves downward. In the second interlocking lever 20, a coupling hole 20a of a circular arc shape is formed at the position near the left end, and an engaging hole 20b of an approximately circular arc shape is formed in the right end portion.

A support point portion 20c serving as a pivot support point with respect to the base chassis 18 is formed in the left end portion of the second interlocking lever 20.

The coupling shaft 19a of the first interlocking lever 19 is inserted into and slidably engaged with the coupling hole 20a of the second interlocking lever 20, and the first interlocking lever 19 and the second interlocking lever 20 pivot on the support point portion 19e and the support point portion 20c in an interlocking manner.

The support shaft 19c of the first interlocking lever 19 is inserted into the base chassis 18 and protrudes downward. A start lever 21 is pivotally supported on the support shaft 19c of the first interlocking lever 19.

The start lever 21 is positioned on the bottom surface of the base chassis 18. The start lever 21 is longitudinally formed in one direction, and a holding and receiving portion 21a of a concave shape that is opened in approximately the front direction is formed on the bottom surface of one end portion in the longitudinal direction. In the start lever 21, a pivot support point portion for the first interlocking lever 19 is formed on the other end in the longitudinal direction, and the pivot support point portion is pivotally supported on the support shaft 19c.

A spring engagement protrusion portion is formed on the position near the pivot support point portion of the start lever 21.

A coil spring 22 is supported between the spring engaging portion 19d of the first interlocking lever 19 and the spring engagement protrusion portion of the start lever 21, and the coil spring 22 applies an urging force to the start lever 21 in the pivot direction in which the holding and receiving portion 21a moves in approximately the front direction.

<First Link Mechanism and so on>

A first link mechanism 23 is supported on the bottom surface side of the base chassis 18 (see FIGS. 10 and 11). The first link mechanism 23 includes a first front link arm 24, a first back link arm 25, and a first rail 26 (see FIGS. 13 and 14).

The first front link arm 24 is formed in a plate shape that faces up and down and extends in one direction, and one end portion in the longitudinal direction is pivotally supported on an lower left corner portion of the base chassis 18. A sleeve 27 is supported on the bottom surface side of the other end portion of the first front link arm 24 in the longitudinal direction. A fixing roller 28 is supported on the bottom surface of the central portion of the first front link arm 24 in the longitudinal direction. At least an outer circumferential portion of the fixing roller 28 is formed of a material that is elastically deformable and has high adhesion such as rubber.

A discharge lever 29 is pivotally supported on the first front link arm 24. A cam engaging portion 30 protruding upward is formed in one end portion of the discharge lever 29 in the longitudinal direction. A pressing roller 31 is supported on the bottom surface of the other end portion of the discharge lever 29 in the longitudinal direction. At least an outer circumferential portion of the pressing roller 31 is formed of a material that is elastically deformable and has high adhesion such as rubber.

Figure 15:
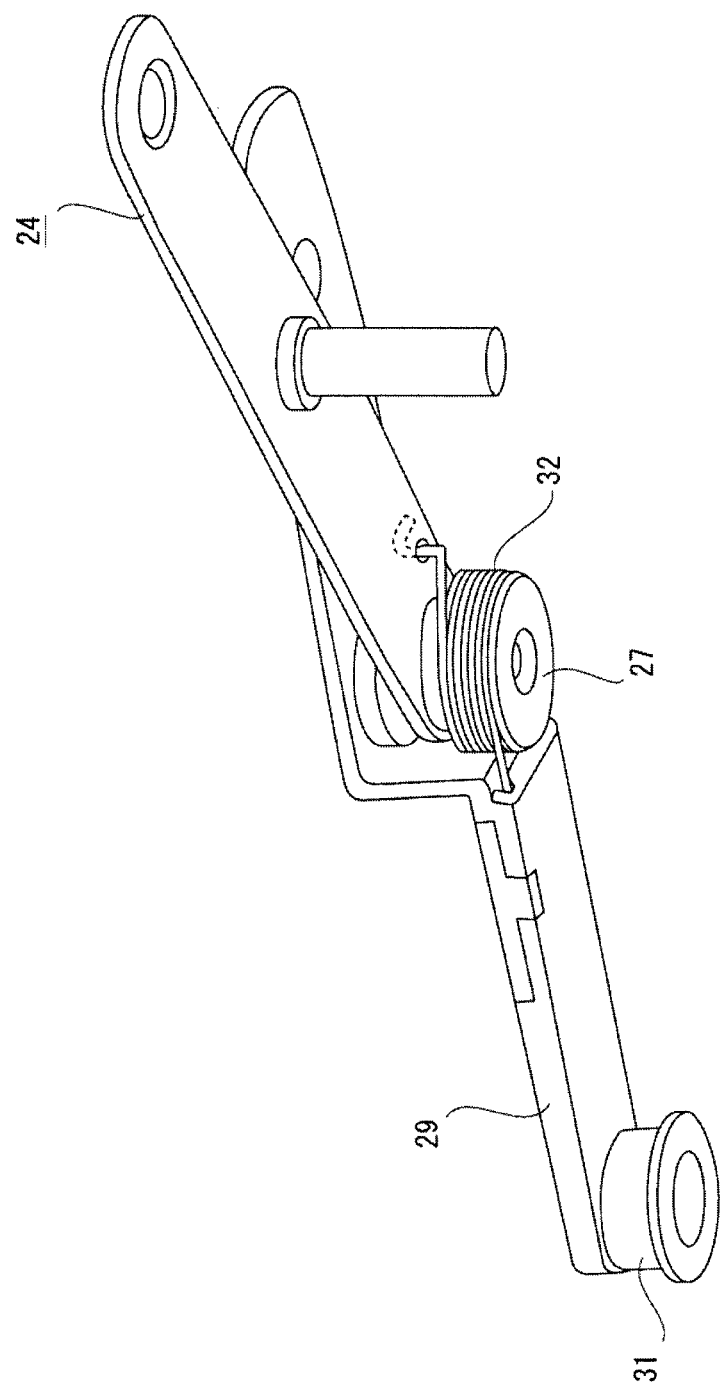
FIG. 15 is an enlarged perspective view illustrating a first front link arm and a discharge lever.
Figure 16:
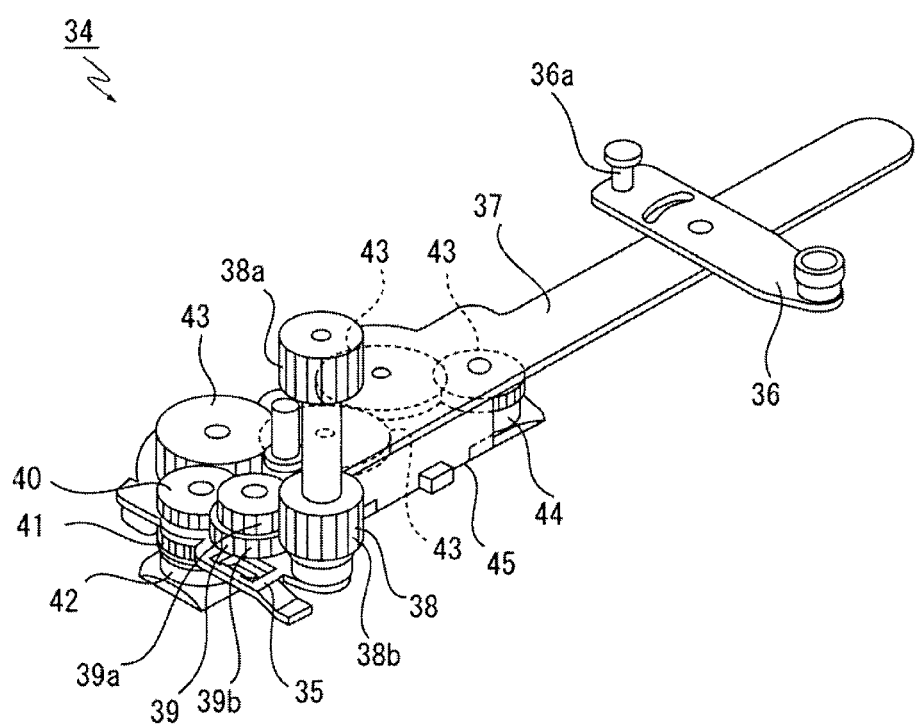
FIG. 16 is a perspective view illustrating a second link mechanism.

In the state in which the discharge lever 29 is supported on the first front link arm 24, the spring member 32 is supported between the first front link arm 24 and the discharge lever 29 (see FIG. 15). The spring member 32 applies pivot force to the discharge lever 29 in a counterclockwise direction when the first front link arm 24 is viewed from above.

In the state in which the first front link arm 24 is supported on the base chassis 18, the cam engaging portion 30 of the discharge lever 29 is inserted into the cam hole 18b of the base chassis 18 from below and slidably engaged with the cam hole 18b of the base chassis 18.

Figure 13:
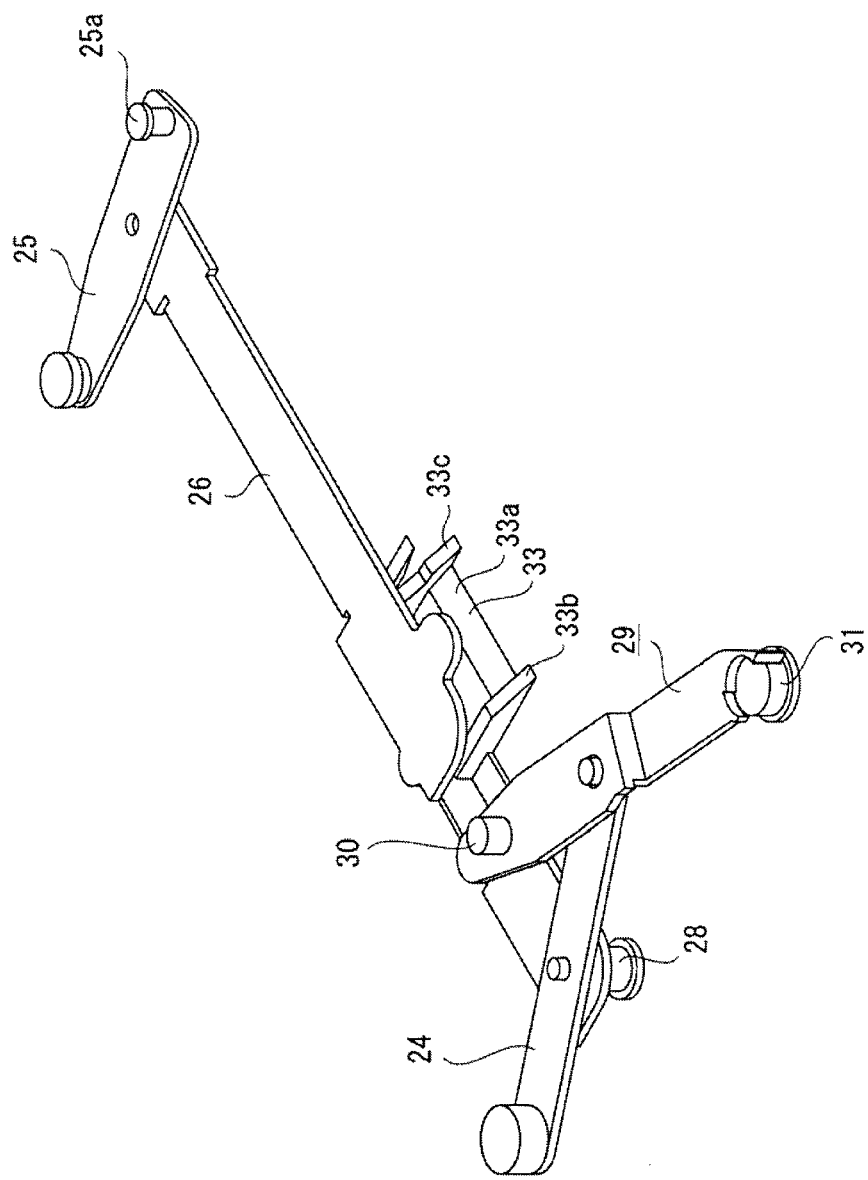
FIG. 13 is a perspective view illustrating a first link mechanism and a storage.
Figure 14:
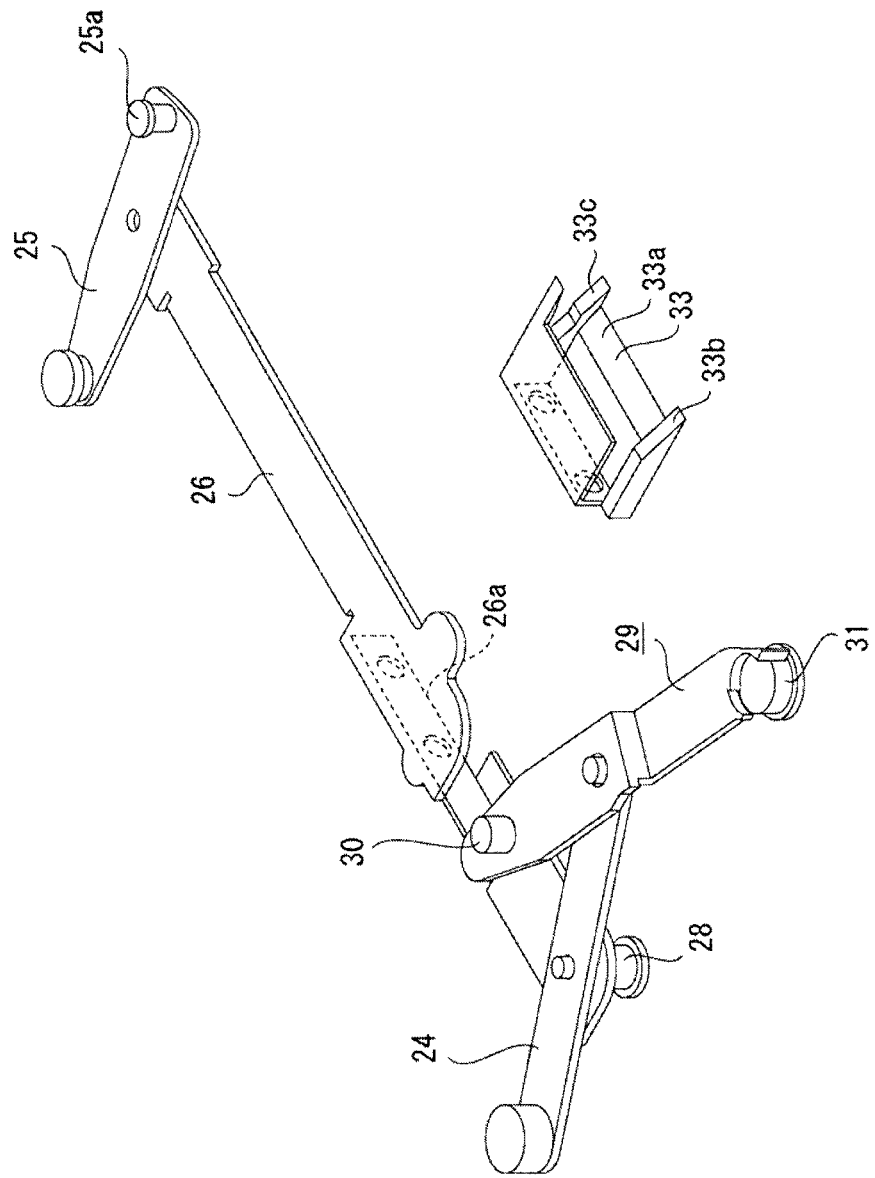
FIG. 14 is a perspective view illustrating a first link mechanism and a storage which are separated from each other.

The first back link arm 25 is formed in a plate shape that faces up and down and extends in one direction, and is pivotally supported on the left end portion of the central portion of the base chassis 18 in the front to back direction (see FIGS. 13 and 14). A coupling shaft portion 25a protruding upward is formed on the end portion of the first back link arm 25 at the side opposite to the pivot support point. In the state in which the first back link arm 25 is supported on the base chassis 18, the coupling shaft portion 25a passes through the base chassis 18 from below, is inserted into the engaging hole 19b formed in the first interlocking lever 19, and slidably engaged with the engaging hole 19b. Thus, the first interlocking lever 19 operates in collaboration with an operation of the first back link arm 25. The first rail 26 is pivotally coupled with the first front link arm 24 and the first back link arm 25. The first rail 26 extends in the front to back direction, and moves left and right while extending in the front to back direction as the first front link arm 24 and the first back link arm 25 pivotally operate. In the first rail 26, the front end portion and the approximately central portion in the front to back direction are pivotally coupled to the first front link arm 24 and the first back link arm 25.

The fixing roller 28 supported on the first front link arm 24 is positioned at the bottom surface side of the front end portion of the first rail 26.

A member attaching portion 26a facing right is formed at the position near the front end of the first rail 26.

A storage 33 is attached to the member attaching portion 26a of the first rail 26 by a screw or the like. The storage 33 is configured with a storage portion 33a having a bracket shape opened in the right direction, a front side guide portion 33b that formed in front of the lower end portion of the storage portion 33a, and a rear side guide portion 33c formed behind the storage portion 33a integrated with one another.

A pair of inclined surfaces that are apart from each other in the right direction are formed apart from each other vertically on the right end portion of the storage portion 33a, an inclined surface that is displaced downward in the right direction is formed on the right end portion of the front side guide portion 33b, and a pair of inclined surfaces that are apart from each <Second Link Mechanism and so on>

A second link mechanism 34 is supported on the bottom surface of the base chassis 18 (see FIGS. 10 and 11). The second link mechanism 34 includes a second front link arm 35, a second back link arm 36, and a second rail 37 (see FIG. 16).

The second front link arm 35 is formed in a plate shape that faces up and down and extends in one direction, and one end portion in the longitudinal direction is pivotally supported on an lower right corner portion of the base chassis 18.

A transmission gear 38 is coupled to one end portion of the second front link arm 35 in the longitudinal direction. The transmission gear 38 includes a first gear portion 38a disposed on the upper end portion and a second gear portion 38b disposed on the lower end portion, and drive force of a drive unit including a drive motor (not shown) is transmitted to the first gear portion 38a.

A two-stage gear 39 is supported on the central portion of the second front link arm 35 in the longitudinal direction. An upper gear portion 39a of the two-stage gear 39 meshes with the second gear portion 38b of the transmission gear 38.

Feed gears 40 and 41 to which a shaft portion is coupled are supported on the upper surface side and the bottom surface side of the other end portion of the second front link arm 35 in the longitudinal direction. The feed gear 40 meshes with a lower gear portion 39b of the two-stage gear 39. A driving roller 42 is coupled to the lower end portion of the shaft portion of the feed gears 40 and 41. At least an outer circumferential portion of the driving roller 42 is formed of a material that is elastically deformable and has high adhesion such as rubber.

As the drive motor of the drive unit rotates, the drive force is transmitted to the transmission gear 38, the drive force transmitted to the transmission gear 38 is sequentially transmitted to the two-stage gear 39, the feed gear 40, and the feed gear 41, and thus the driving roller 42 rotates. The second back link arm 36 is formed in a plate shape that faces up and down and extends in one direction, and one end portion in the longitudinal direction is pivotally supported on the right end portion of the central portion of the base chassis 18 in the front to back direction. A coupling shaft portion 36a protruding upward is disposed on an end portion of the second back link arm 36 at the side opposite to the pivot support point. In a state in which the link arm 36 is supported on the base chassis 18, the coupling shaft portion 36a is inserted into the base chassis 18 from below, inserted into the engaging hole 20b formed in the second interlocking lever 20 at the right side, and slidably engaged with the engaging hole 20b. Thus, the second interlocking lever 20 operates in collaboration with the operation of the second back link arm 36.

The second rail 37 is pivotally coupled to the second front link arm 35 and the second back link arm 36. The second rail 37 extends in the front to back direction, and moves left and right while extending in the front to back direction as the second front link arm 35 and the second back link arm 36 pivotally operate. Thus, the first rail 26 and the second rail 37 move left and right in parallel at all times.

Portions of the second rail 37 near the front end portion and the rear end are pivotally coupled to the second front link arm 35 and the second back link arm 36.

Feed spur gears 43 meshed with one another are supported on the front half portion of the second rail 37. The feed spur gear 43 positioned on the foremost side meshes with the feed gear 40. The feed spur gear 43 positioned at the rearmost side is coaxially coupled to a rotary roller 44.

Thus, the drive force of the drive motor transmitted to the feed gear 40 is sequentially transmitted to the rotary roller 44 through the feed spur gears 43, and thus the rotary roller 44 rotates. The rotary roller 44 rotates in the same direction in synchronization with the driving roller 42.

The feed gear 40 and the feed spur gears 43 are covered with a gear cover 45 from the bottom surface side.

A spring member (not shown) urges the first rail 26 of the first link mechanism 23 and the second rail 37 of the second link mechanism 34 to approach each other from the left and right.

As described above, the coupling shaft 19a is slidably engaged with the coupling hole 20a for the first interlocking lever 19 and the second interlocking lever 20, the coupling shaft portion 25a is slidably engaged with the engaging hole 19b of the first interlocking lever 19 for the first back link arm 25, and the coupling shaft portion 36a is slidably engaged with the engaging hole 20b of the second interlocking lever 20 for the second back link arm 36.

Thus, the first rail 26 supported on the first front link arm 24 and the first back link arm 25 and the second rail 37 supported on the second front link arm 35 and the second back link arm 36 are coupled to each other through the first interlocking lever 19 and the second interlocking lever 20 and move left and right in parallel while separating from and approaching each other.

<Route Guides>

Figure 17:
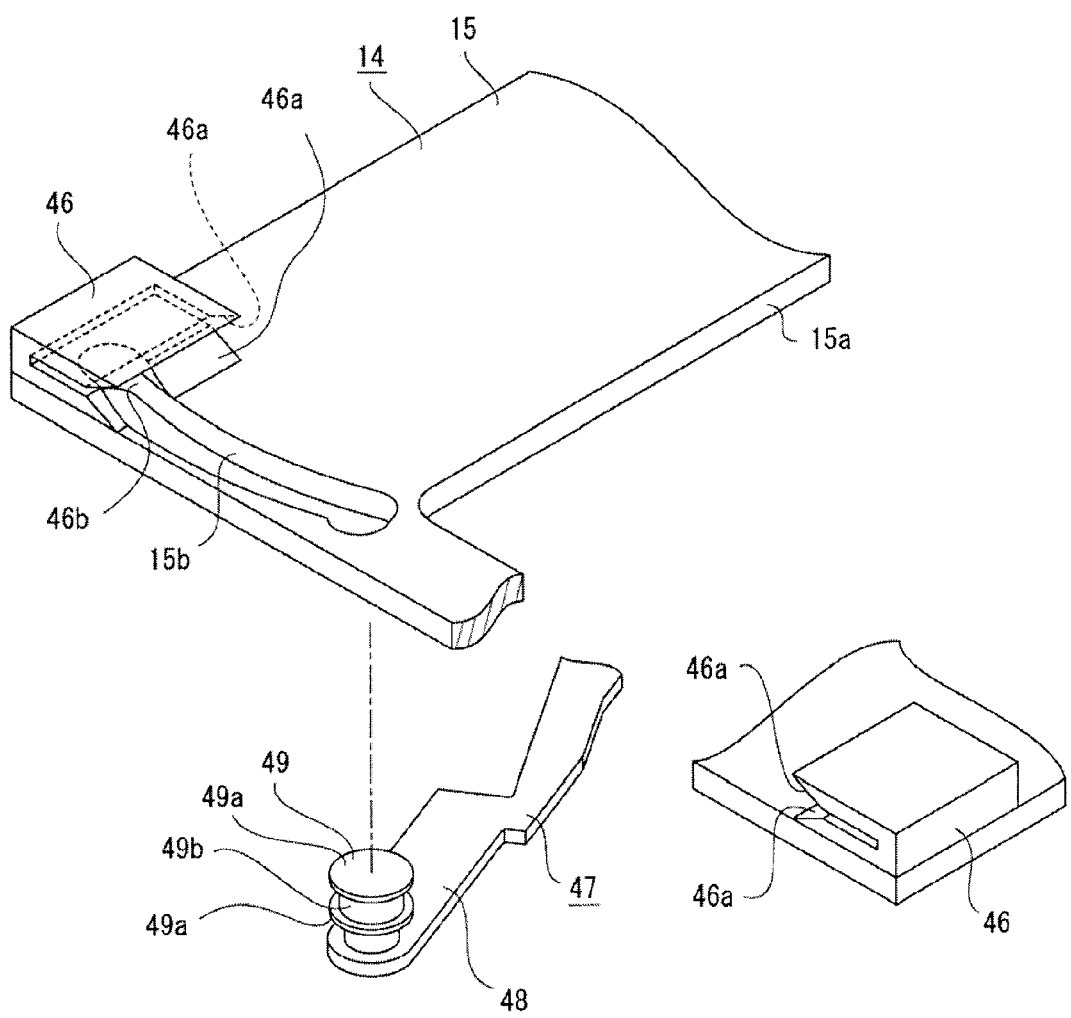
FIG. 17 is a schematic enlarged perspective view illustrating a route guide and a holding lever.

Route guides 46 are attached to both left and right end portions of the front end portion of the base plate 14 (see FIGS. 10, 11, and 17). The route guides 46 have approximate bracket shapes that are opened in mutually approaching directions, and include a pair of inclined guide surfaces 46a that are formed on the end portion of the inner side thereof, apart from each other along the front end.

The left route guide 46 is partially notched, and the notched portion is formed as a storage concave portion 46b. The storage concave portion 46b extends in approximately the left and right, and the right end of the storage concave portion 46b is positioned on the front end of the inclined guide surface 46a at the lower side.

<Holding Lever>

A holding lever 47 is pivotally supported on the bottom surface side of the base plate 14. The holding lever 47 includes an arm portion 48 extending in approximately the front to back direction and a roller portion 49 that is rotatably supported on the front end portion of the arm portion 48.

A portion of the arm portion 48 supported on the base plate 14 is formed as a support point shaft portion 48a. An urging spring 50 is supported between a portion at the rear side further than the support point shaft portion 48a of the arm portion 48 and the base plate 14. The urging spring 50 urges the holding lever 47 so that the roller portion 49 moves in approximately the right direction.

The roller portion 49 is inserted into the roller insertion hole 15b of the base plate 14 and protrudes upward from the upper surface of the base plate 14. In the roller portion 49, both lower and upper end portions extend outward and are disposed as a pair of flange portions 49a, and a portion between the flange portions 49a is disposed as a contact portion 49b of a cylindrical shape.

[Operation of Disk Conveying Device]

Next, an operation of the disk conveying device 1 conveying the disk-like recording medium 200 will be described (see FIGS. 18 to 36).

As the respective components start to operate from an initial state before the disk-like recording medium 200 is loaded, the disk conveying device 1 conveys the disk-like recording medium 200 extracted from the disk cartridge 100 up to the recording and reproduction position in the retraction direction (back direction) through the loading operation, chucks the disk-like recording medium 200 at the recording and reproduction position, and performs recording or reproduction of the information signal recorded in the disk-like recording medium 200. When the recording or reproduction of the information signal on the disk-like recording medium 200 ends, the disk conveying device 1 releases the chucking of the disk-like recording medium 200, conveys the disk-like recording medium 200 from the recording and reproduction position to the storage position in the discharge direction (front direction) through the ejection operation, stores the disk-like recording medium 200 in the disk cartridge 100, and then returns to the initial state.

During the loading operation and the ejection operation, the disk-like recording medium 200 is conveyed as the first interlocking lever 19, the second interlocking lever 20, the first link mechanism 23, the second link mechanism 34, and the like operate. Thus, the first interlocking lever 19, the second interlocking lever 20, the first link mechanism 23, and the second link mechanism 34 function as a conveying mechanism that conveys the disk-like recording medium 200.

<Initial State>

First, an initial state of each component will be described (see FIGS. 18 and 19).

In the initial state, the drive motor does not rotate, and the driving roller 42 and the rotary roller 44 do not rotate.

Figure 18:
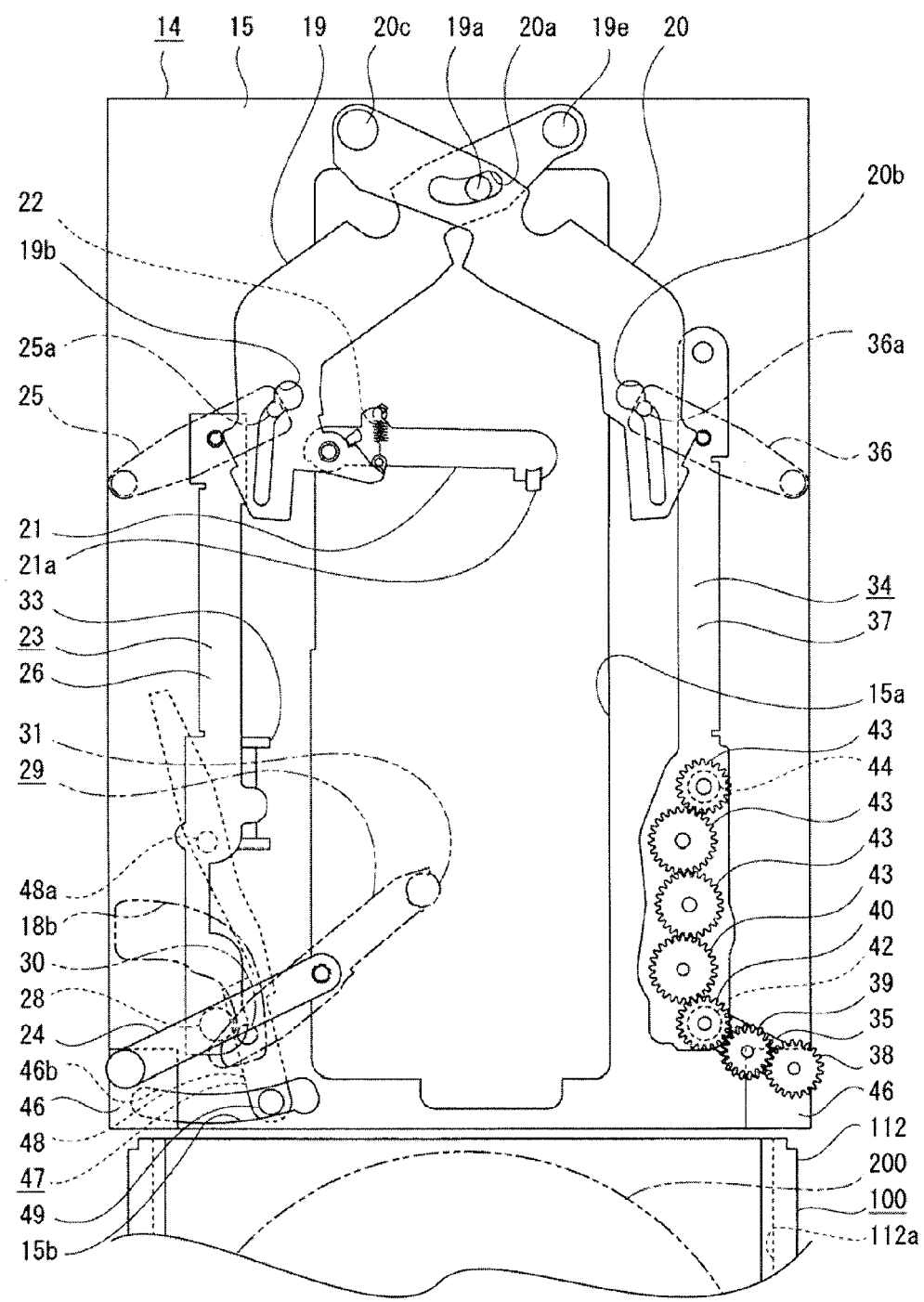
FIG. 18 illustrates an operation of a disk conveying device together with FIGS. 19 to 36, and is a schematic plane view illustrating an initial state of each mechanism.

In the initial state, the first front link arm 24, the first back link arm 25, the second front link arm 35, and the second back link arm 36 are in the inwardly oblique state, and the discharge lever 29 is in the inwardly oblique state as well (see FIG. 18). Thus, in this state, the pressing roller 31 of the discharge lever 29 is extracted in the right direction from the storage 33.

At this time, the distance between the fixing roller 28 supported on the first front link arm 24 and the driving roller 42 supported on the second front link arm 35 is smaller than the diameter of the disk-like recording medium 200.

Figure 19:
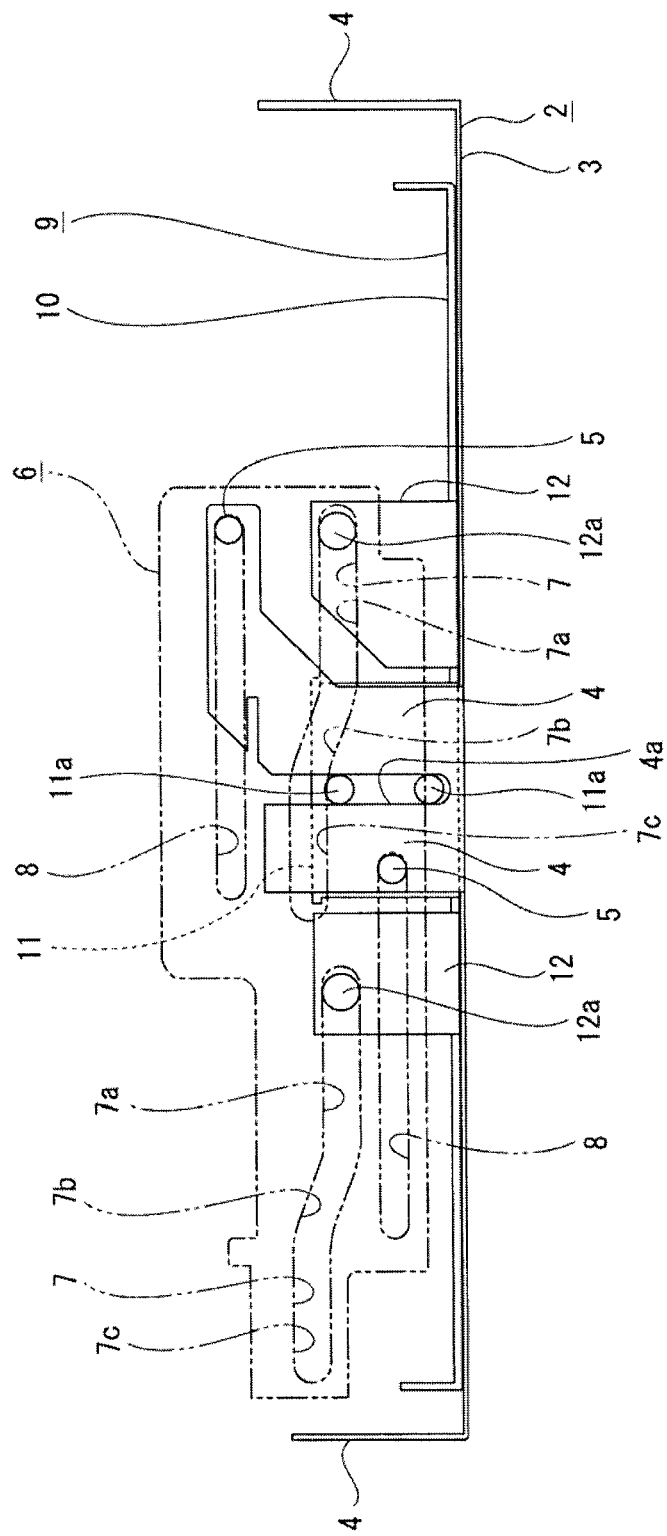

The guided pins 12a of the second side surface portions 12 of the unit plate 9 are engaged with the rear cam portions 7a of the lifting cam holes 7 in the side sliders 6 (see FIG. 19). Thus, the unit plate 9 and the base unit arranged on the unit plate 9 are held to the lower movable end.

The roller portion 49 of the holding lever 47 is held to the right movable end by the urging force of the urging spring 50.

<Loading Operation>

When the disk-like recording medium 200 is extracted from the disk cartridge 100 in the back direction (retraction direction) by the extraction mechanism installed in the disk changer 160, the disk conveying device 1 performs the following loading operation (see FIGS. 20 to 28).

Figure 20:
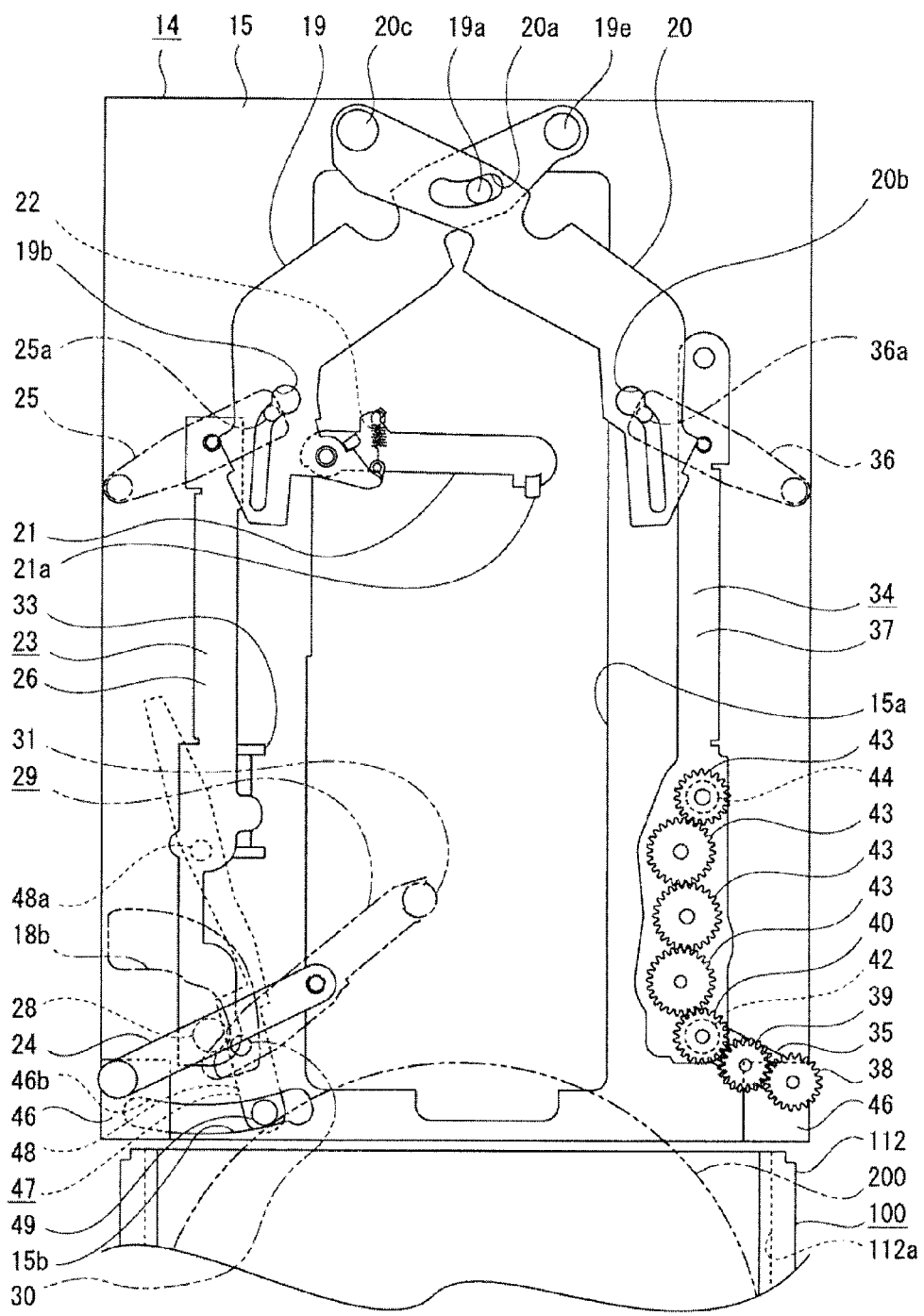
FIG. 20 is a schematic plane view illustrating a state in which a loading operation starts, and a disk-like recording medium comes into contact with a roller portion of a holding lever.

As the disk-like recording medium 200 is extracted from the disk cartridge 100 in the back direction, the outer circumferential surface of the disk-like recording medium 200 comes into contact with the roller portion 49 of the holding lever 47 (see FIG. 20).

Figure 21:
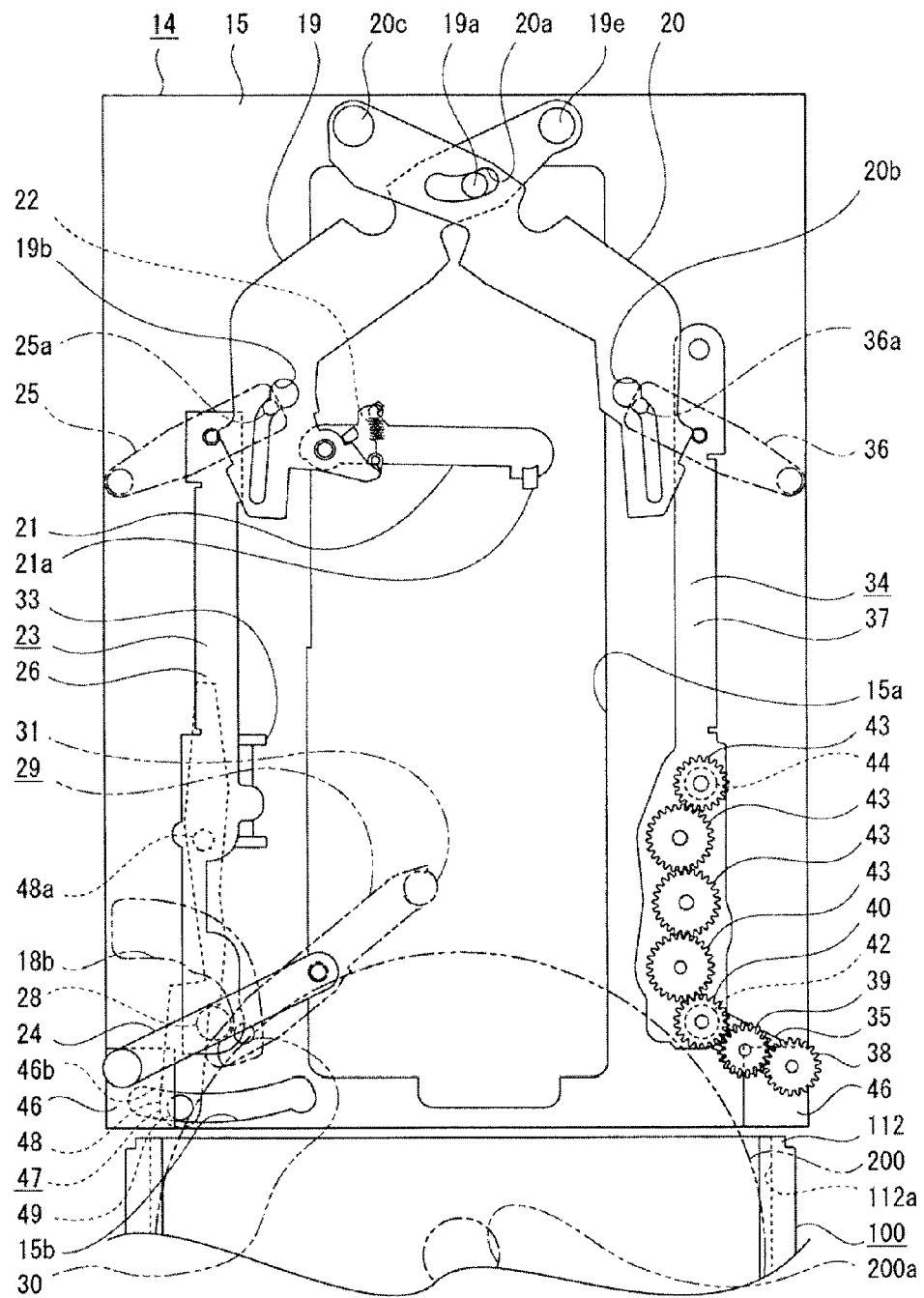
FIG. 21 is a schematic plane view illustrating a state in which a disk-like recording medium is continuously conveyed toward a recording and reproduction position, and a roller portion of a holding lever is pressed by a disk-like recording medium.

As the disk-like recording medium 200 moves further back, the holding lever 47 is pressed by the disk-like recording medium 200, and the holding lever 47 pivots against the urging force of the urging spring 50 so that the roller portion 49 moves left (see FIG. 21).

Figure 22:
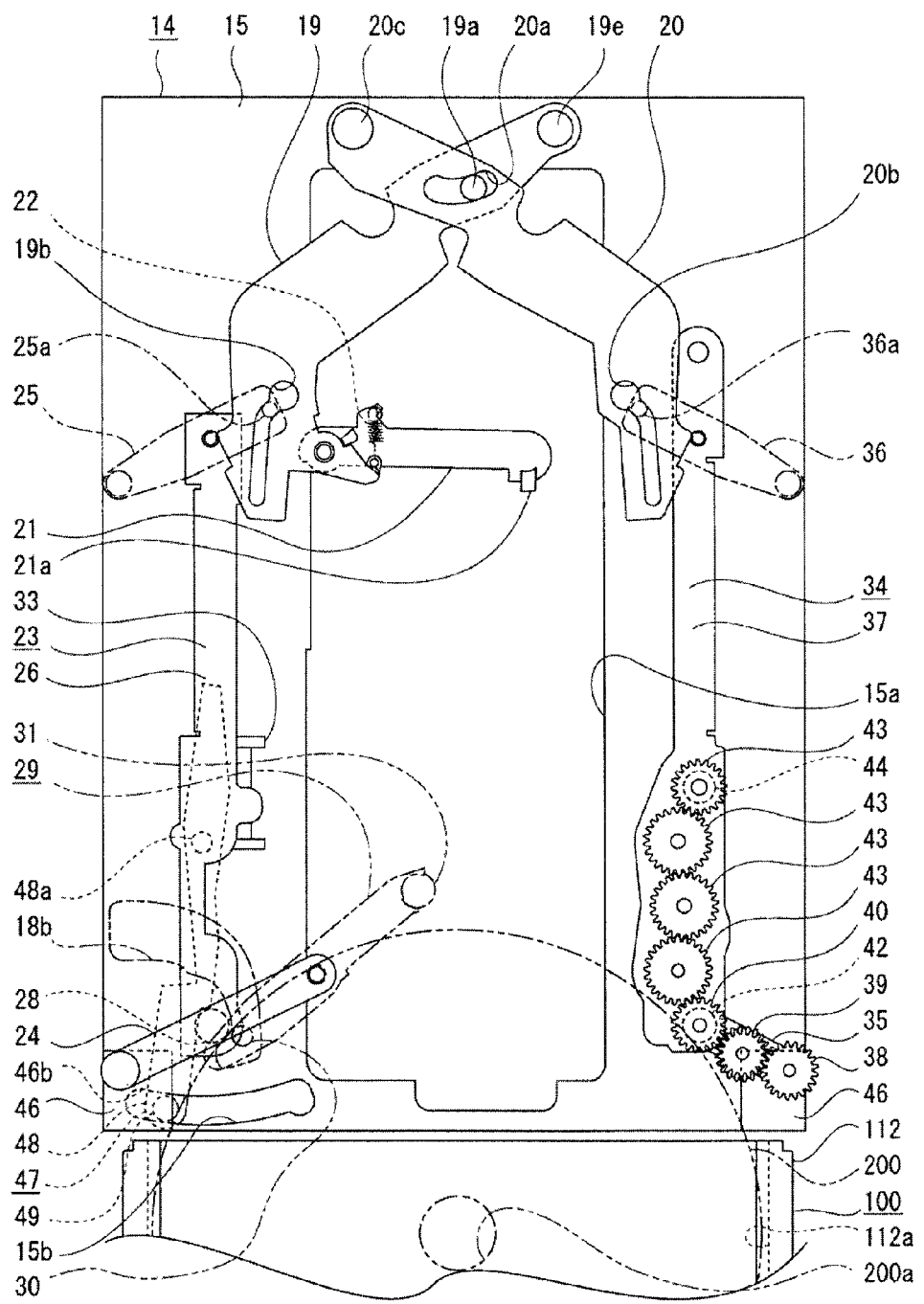
FIG. 22 is a schematic plane view illustrating a state in which a disk-like recording medium is continuously conveyed to a recording and reproduction position, and a disk-like recording medium comes into contact with a fixing roller and a driving roller.

As the disk-like recording medium 200 moves further back, the outer circumferential surface of the disk-like recording medium 200 comes into contact with the driving roller 42 and the fixing roller 28 (see FIG. 22). At this time, the drive motor rotates by a detection operation of a sensor (not shown) based on the insertion of the disk-like recording medium 200. As the drive motor rotates, the drive force is sequentially transmitted to the transmission gear 38, the two-stage gear 39, the feed gear 40, and the feed gear 41, and thus the driving roller 42 rotates. The drive force of the drive motor is also transmitted to the rotary roller 44 through the feed gear 40 and the feed spur gears 43, and thus the rotary roller 44 rotates in the same direction in synchronization with the driving roller 42.

At this time, the holding lever 47 further pivots so that the roller portion 49 moves left, and the roller portion 49 is stored in the storage concave portion 46b of the route guide 46.

Figure 23:
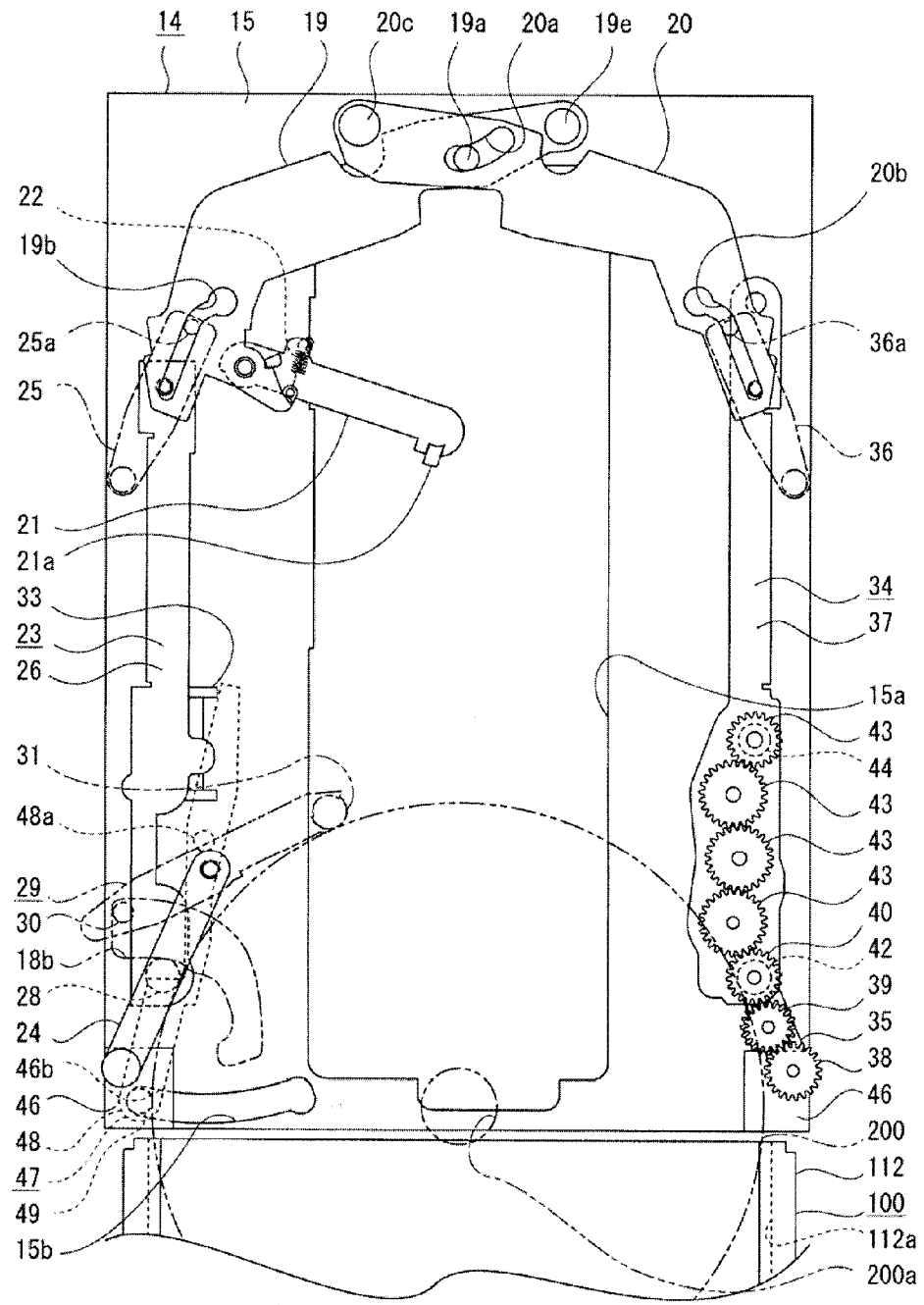
FIG. 23 is a schematic plane view illustrating a state in which a disk-like recording medium is continuously conveyed to a recording and reproduction position as a driving roller rotates.

As the driving roller 42 rotates, the disk-like recording medium 200 is conveyed in the back direction by the driving roller 42 and the fixing roller 28 (see FIG. 23). The outer circumferential portion of the disk-like recording medium 200 is inserted into the route guides 46, guided to the route guides 46, and moves in the back direction. At this time, the holding lever 47 presses the outer circumferential surface of the disk-like recording medium 200 by the urging force of the urging spring 50.

As the disk-like recording medium 200 is conveyed in the back direction, the first rail 26 and the second rail 37 move in parallel to be separated from each other, and thus the first front link arm 24, the first back link arm 25, the second front link arm 35, and the second back link arm 36 pivot outward. At this time, the discharge lever 29 pivots outward as the first front link arm 24 pivots. Further, as the first back link arm 25 and the second back link arm 36 pivot, the first interlocking lever 19 and the second interlocking lever 20 pivot in certain directions.

When the discharge lever 29 pivots as the first front link arm 24 pivots, the cam engaging portion 30 of the discharge lever 29 slidably moves along the cam hole 18b of the base chassis 18.

When the first back link arm 25 pivots, the coupling shaft portion 25a moves along the engaging hole 19b formed in the first interlocking lever 19. Further, when the second back link arm 36 pivots, the coupling shaft portion 36a moves along the engaging hole 20b formed in the second interlocking lever 20.

Figure 24:
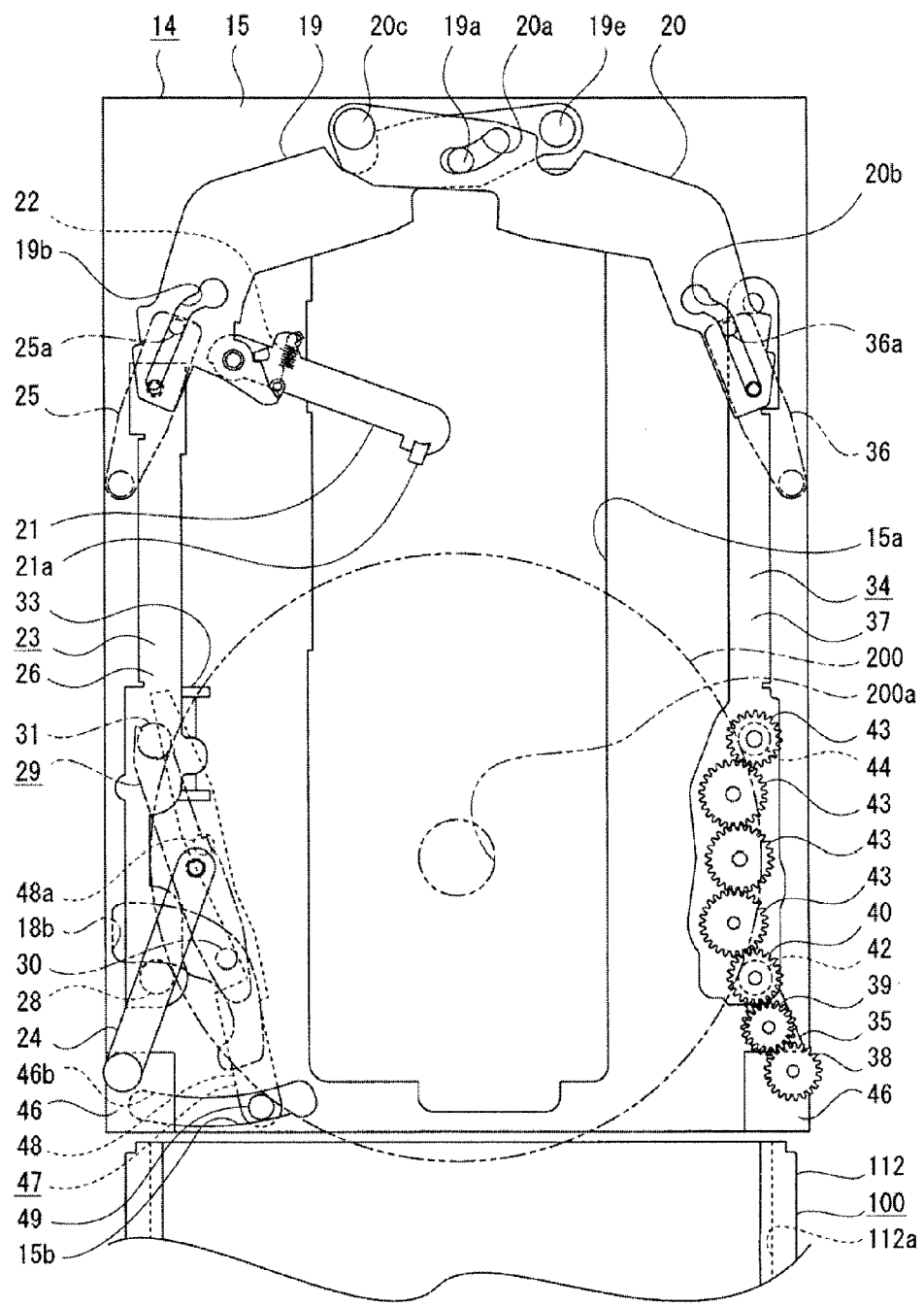
FIG. 24 is a schematic plane view illustrating a state in which a disk-like recording medium is continuously conveyed to a recording and reproduction position, and a disk-like recording medium is held by a fixing roller, a driving roller, a rotating roller, and a pressing roller.

When the disk-like recording medium 200 is further conveyed in the back direction by the driving roller 42 and the fixing roller 28 and the first front link arm 24 extends in approximately the front to back direction, the discharge lever 29 also pivots together with the first front link arm 24, and the pressing roller 31 is stored in the storage portion 33a of the storage 33 (see FIG. 24).

When the disk-like recording medium 200 is conveyed in the back direction by the driving roller 42 and the fixing roller 28 and the pressing roller 31 is stored in the storage portion 33a of the storage 33, the outer circumferential surface of the disk-like recording medium 200 comes into contact with the driving roller 42, the fixing roller 28, the pressing roller 31, and the rotary roller 44.

Figure 25:
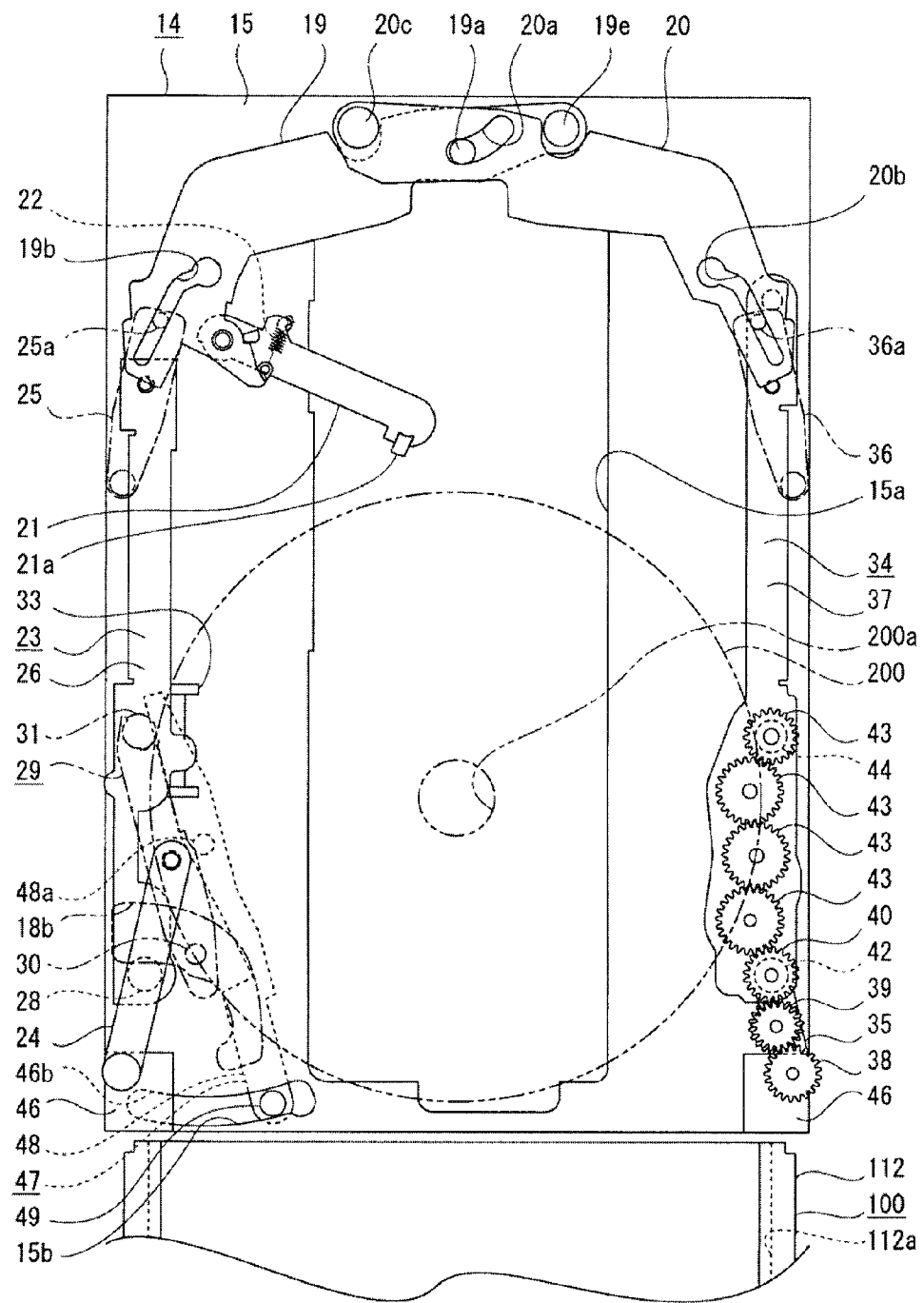
FIG. 25 is a schematic plane view illustrating a state in which a disk-like recording medium is continuously conveyed to a recording and reproduction position as a rotating roller rotates.

Then, the disk-like recording medium 200 is conveyed in the back direction by the rotary roller 44 and the pressing roller 31, and the driving roller 42 and the fixing roller 28 are separated from the outer circumferential surface of the disk-like recording medium 200 (see FIG. 25). At this time, the holding lever 47 pivots until the roller portion 49 is separated from the outer circumferential surface of the disk-like recording medium 200 and the roller portion 49 is positioned to the right movable end.

Figure 26:
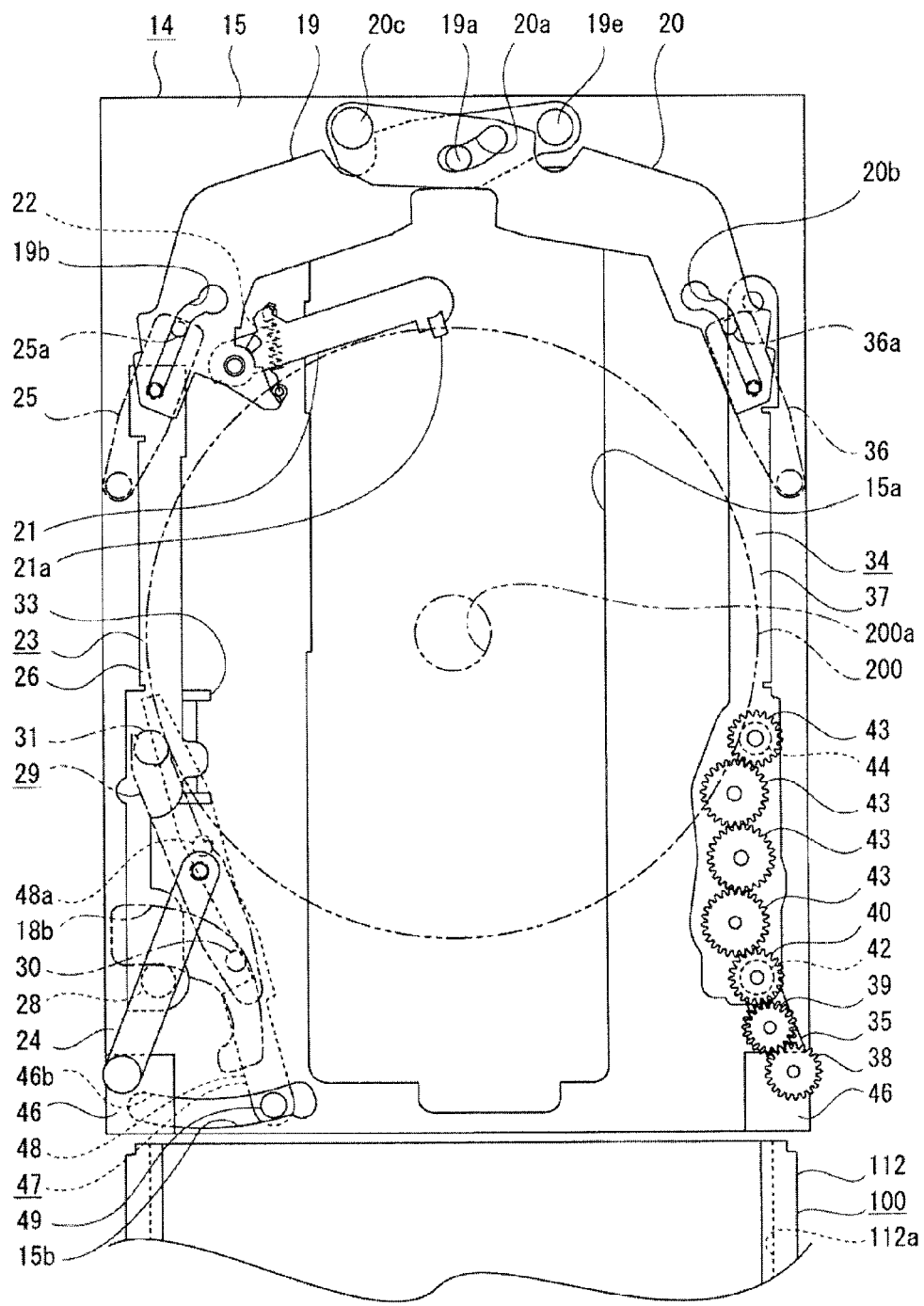
FIG. 26 is a schematic plane view illustrating a state in which a disk-like recording medium is conveyed to a recording and reproduction position.

The disk-like recording medium 200 is continuously conveyed up to the recording and reproduction position in the back direction by the rotary roller 44 and the pressing roller 31 (see FIG. 26).

When the disk-like recording medium 200 is conveyed up to the recording and reproduction position, that is, the position at which the center hole 200a of the disk-like recording medium 200 is positioned directly above the disk table of the base unit, the outer circumferential surface of the disk-like recording medium 200 is held by the pressing roller 31, the rotary roller 44, and the holding and receiving portion 21a of the start lever 21.

When the disk-like recording medium 200 is conveyed up to the recording and reproduction position, the holding and receiving portion 21a of the start lever 21 pivotally supported by the first interlocking lever 19 is pressed in the back direction by the outer circumferential surface of the disk-like recording medium 200. As the holding and receiving portion 21a is pressed in the back direction by the disk-like recording medium 200, the start lever 21 pivots against the urging force of the coil spring 22. As the start lever 21 pivots, the side sliders 6 are moved back by the drive mechanism. At this time, the rotation of the drive motor stops, and the rotation of the driving roller 42 and the rotary roller 44 stops.

Figure 27:
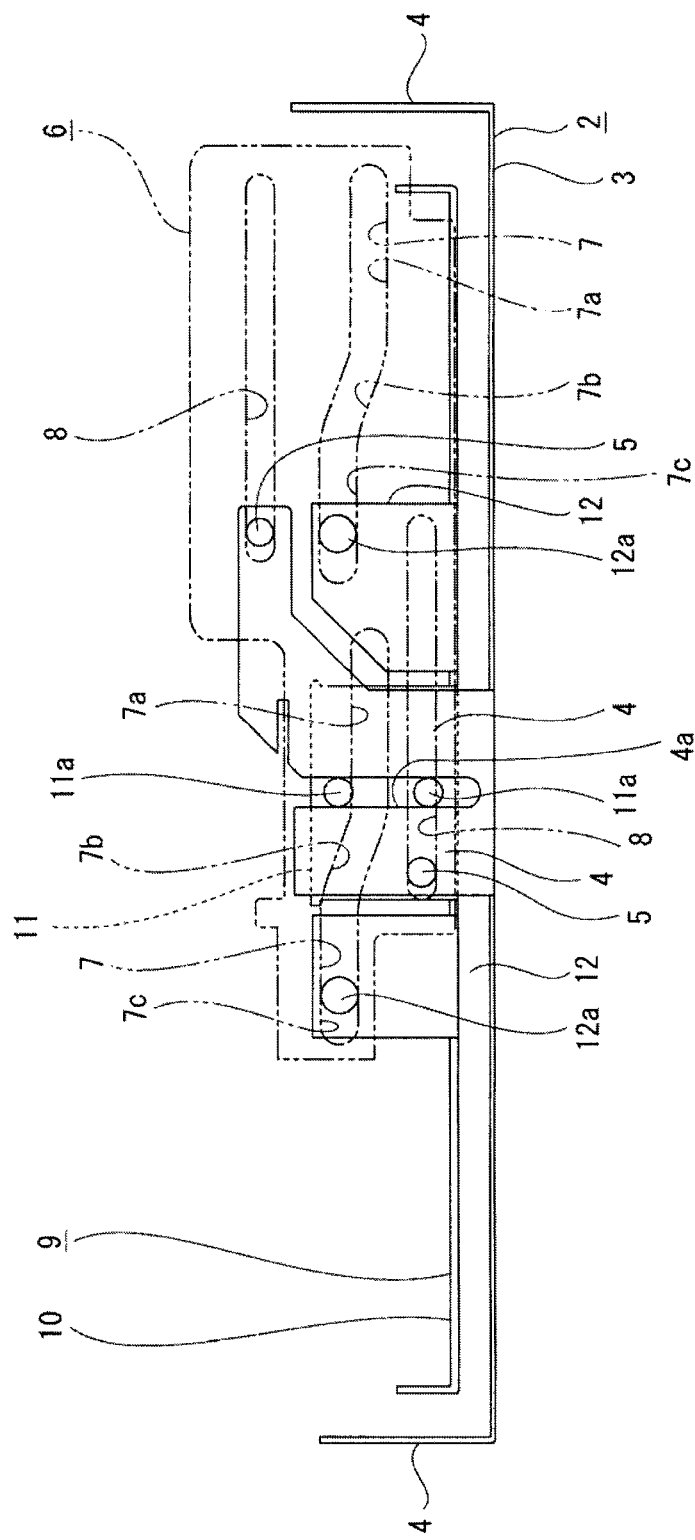
FIG. 27 is a schematic side view illustrating a state in which a unit plate is moved to an upper movable end when a disk-like recording medium is conveyed to a recording and reproduction position.

As the side sliders 6 moves in the back direction, the guided pins 12a of the unit plate 9 move from the rear cam portions 7a of the lifting cam holes 7 up to the front cam portions 7c through the inclined cam portions 7b (see FIG. 27). Thus, the base unit arranged on the unit plate 9 and the unit plate 9 moves up to the upper movable end. In the state in which the base unit has moved up to the upper movable end, a part of the base unit is inserted into the base unit insertion hole 15a formed in the base plate portion 15 of the base plate 14.

As the base unit moves up to the upper movable end, the chucking pulley is attached to the disk table through the disk-like recording medium 200, and the disk-like recording medium 200 is pinched and chucked by the disk table and the chucking pulley, and thus the loading of the disk-like recording medium 200 is completed.

Figure 28:
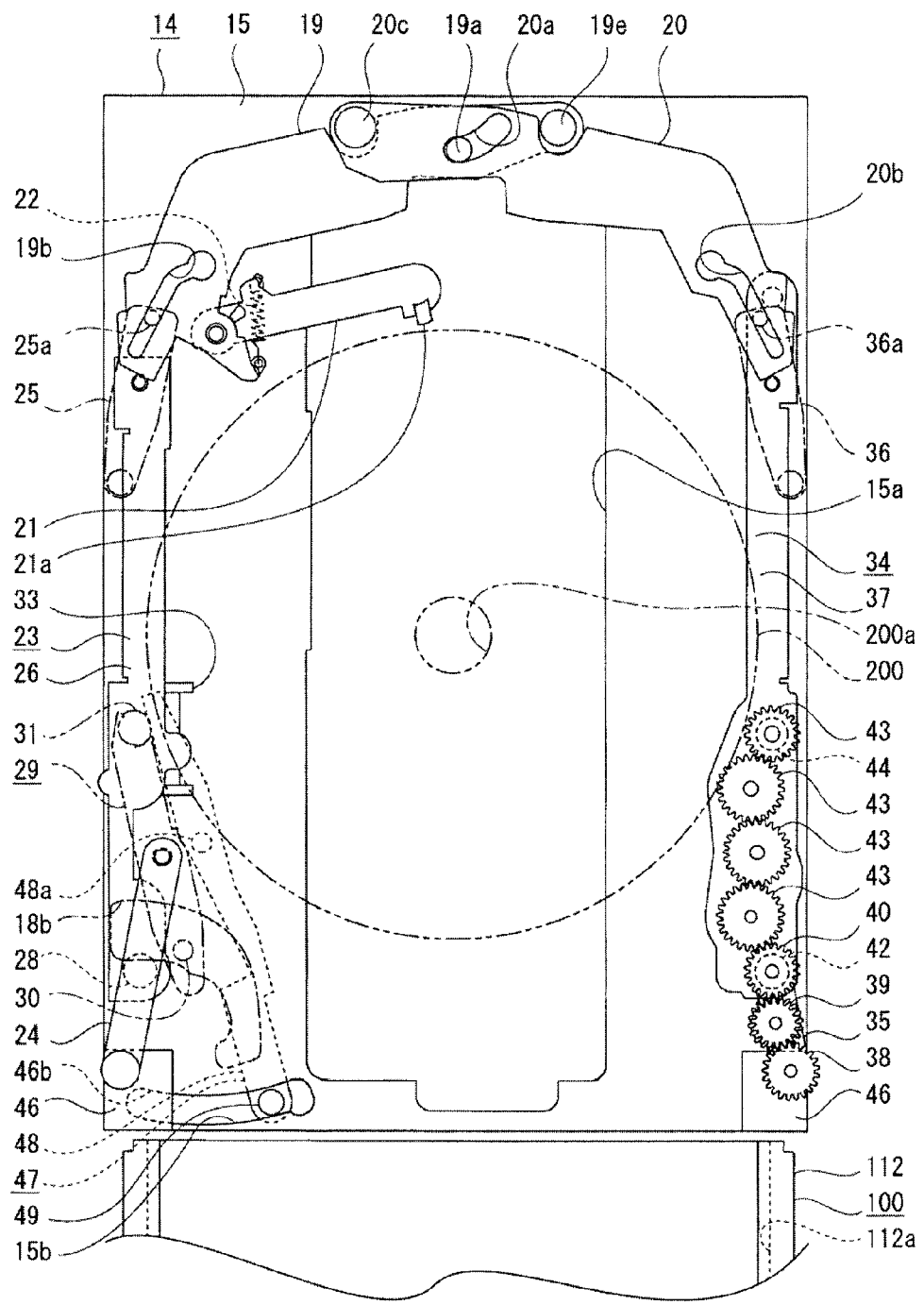
FIG. 28 is a schematic plane view illustrating a state in which a rotating roller, a pressing roller, disk holding pin, and a holding and receiving portion are separated from a disk-like recording medium when a disk-like recording medium is conveyed to a recording and reproduction position.

When the disk-like recording medium 200 is chucked by the disk table and the chucking pulley, the first rail 26 and the second rail 37 are moved to be separated from each other by the drive mechanism, and the pressing roller 31 and the rotary roller 44 are separated from the outer circumferential portion of the disk-like recording medium 200 (see FIG. 28). At the same time, as the first back link arm 25 and the second back link arm 36 pivot, the first interlocking lever 19 and the second interlocking lever 20 pivot, the start lever 21 pivots, and the holding and receiving portion 21a is separated from the outer circumferential surface of the disk-like recording medium 200.

As the disk-like recording medium 200 is chucked by the disk table and the chucking pulley, the disk table rotates, the optical pickup starts to be driven, and recording or reproduction of the information signal on the disk-like recording medium 200 is performed.

When the recording or reproduction of the information signal ends, the rotation of the disk table stops, and the driving of the optical pickup ends.

<Ejection Operation>

When the recording or reproduction of the information signal on the disk-like recording medium 200, the disk conveying device 1 performs the following ejection operation (see FIGS. 29 to 36).

The ejection operation starts as the drive motor rotates in the direction opposite to the rotation direction in the loading operation.

As the drive motor rotates in the direction opposite to the rotation direction in the loading operation, the side sliders 6 move in the front direction, and the guided pins 12a of the unit plate 9 move from the front cam portions 7c of the lifting cam holes 7 up to the rear cam portions 7a through the inclined cam portions 7b. Thus, the base unit arranged on the unit plate 9 and the unit plate 9 move up to the lower movable end, and chucking of the disk-like recording medium 200 by the disk table and the chucking pulley is released.

When the chucking of the disk-like recording medium 200 by the disk table and the chucking pulley is released, the first rail 26 and the second rail 37 are moved toward each other by the drive mechanism, and the pressing roller 31 and the rotary roller 44 come into contact with the outer circumferential portion of the disk-like recording medium 200. At the same time, as the first back link arm 25 and the second back link arm 36 pivot, the first interlocking lever 19 and the second interlocking lever 20 pivot, the start lever 21 pivots, and the holding and receiving portion 21a comes into contact with the outer circumferential surface of the disk-like recording medium 200. Thus, the disk-like recording medium 200 is held by the pressing roller 31, the rotary roller 44, and the holding and receiving portion 21a.

Figure 29:
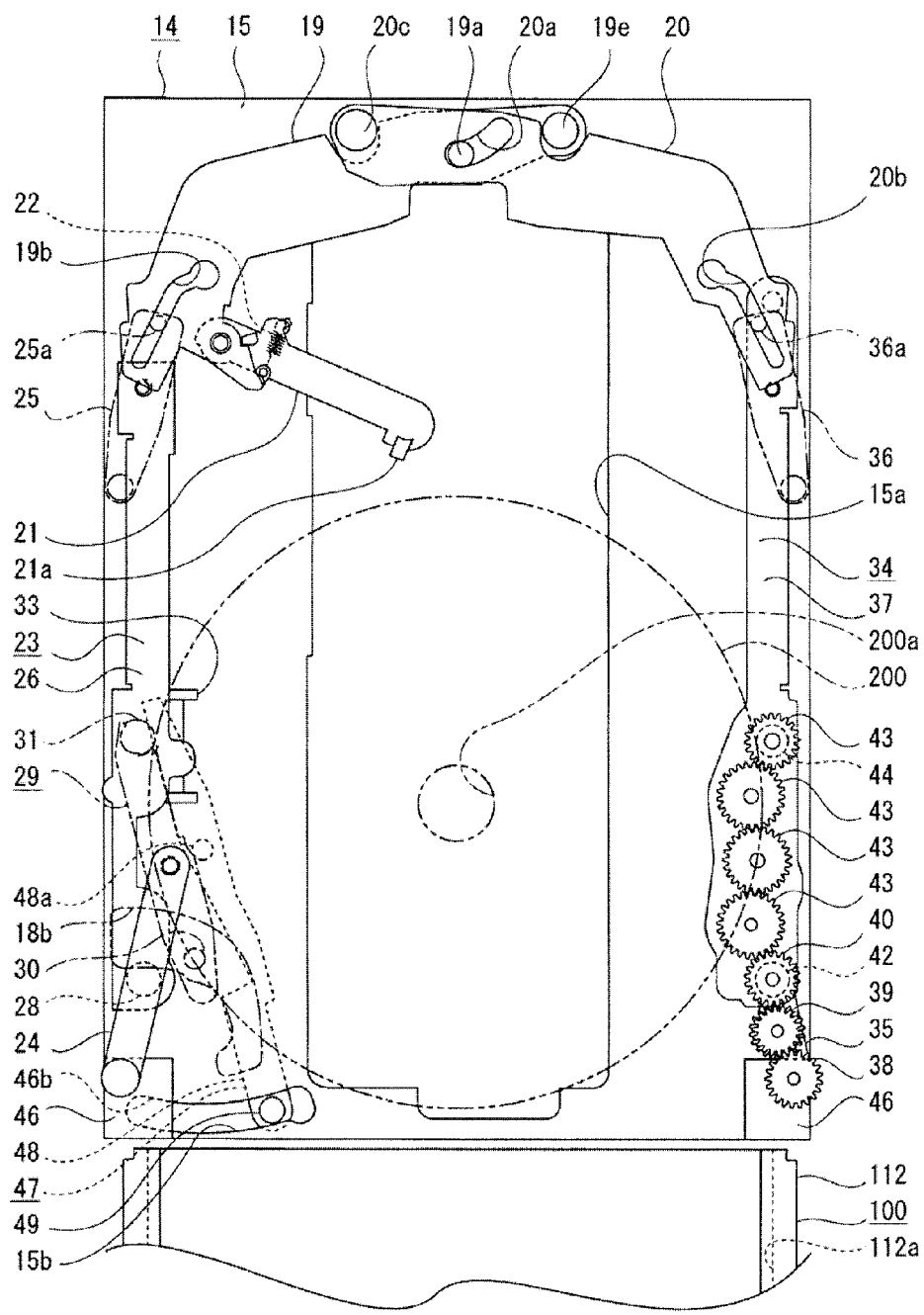
FIG. 29 is a schematic plane view illustrating a state in which an ejection operation starts, and a disk-like recording medium is held by a rotating roller and a pressing roller.

The disk-like recording medium 200 is conveyed toward the disk cartridge 100 in the front direction (the discharge direction) by the rotation of the rotary roller 44 in the state in which the disk-like recording medium 200 is held by the pressing roller 31 and the rotary roller 44 by the operations reverse to the respective operations in the loading operation (see FIG. 29).

Figure 30:
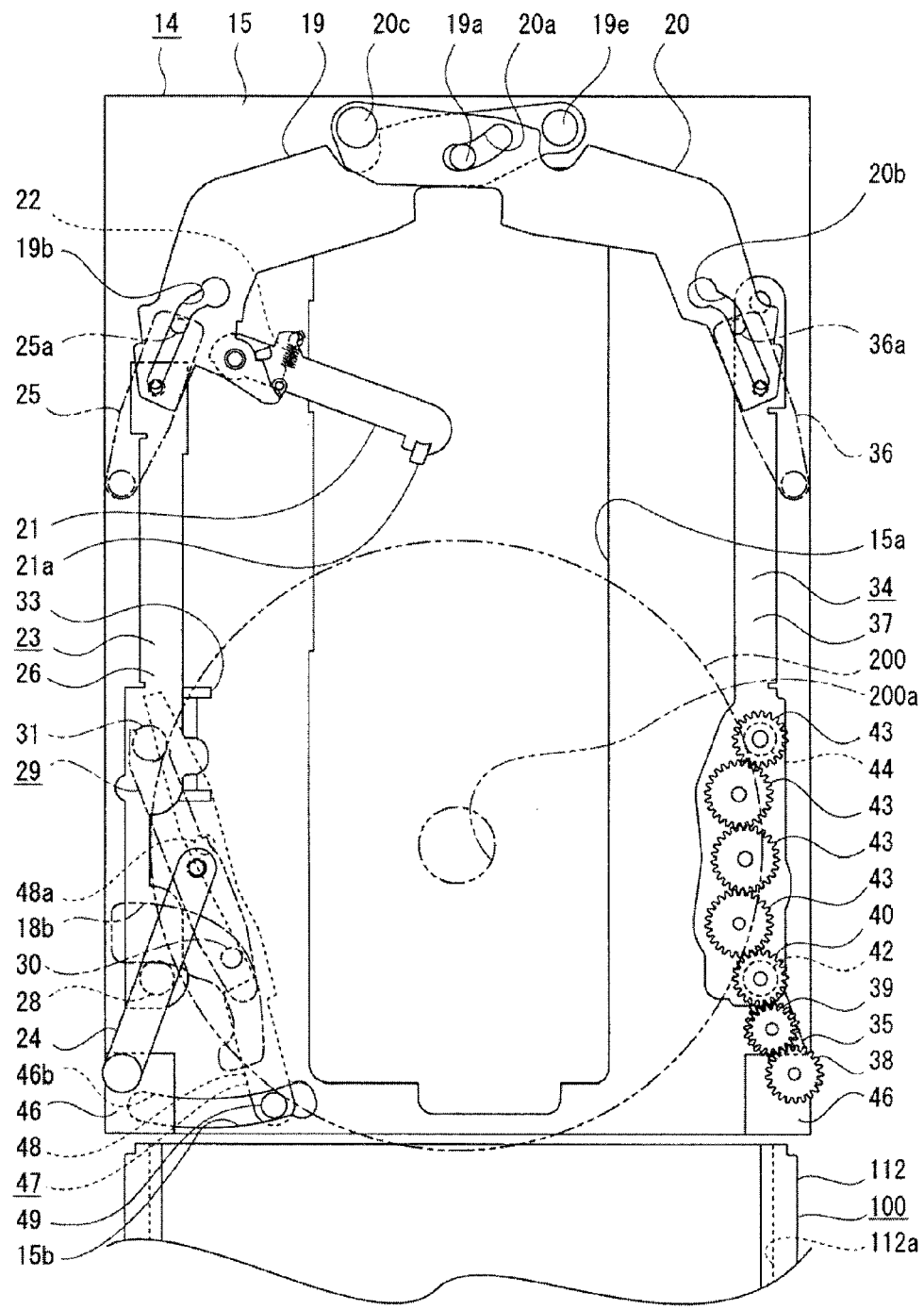
FIG. 30 is a schematic plane view illustrating a state in which a disk-like recording medium is continuously conveyed to a storage position, and a disk-like recording medium comes into contact with a roller portion of a holding lever.
Figure 31:
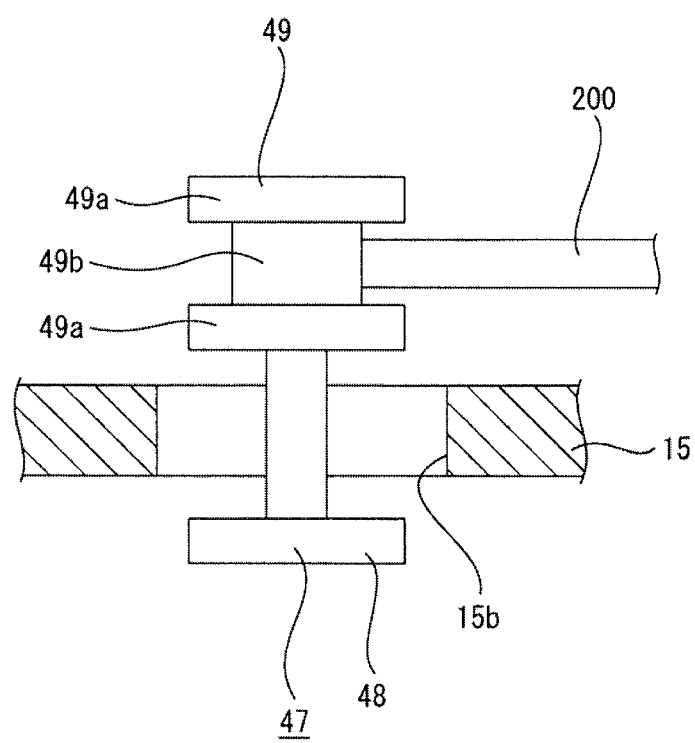
FIG. 31 is an enlarged side view partially illustrating a cross section of a state in which a disk-like recording medium is held by a holding lever.

As the disk-like recording medium 200 is further conveyed in the front direction, the outer circumferential surface of the disk-like recording medium 200 comes into contact with the roller portion 49 of the holding lever 47, and the disk-like recording medium 200 is held by the pressing roller 31, the rotary roller 44, and the roller portion 49 (see FIG. 30). At this time, the outer circumferential portion of the disk-like recording medium 200 is inserted between the flange portions 49a of the roller portion 49, and the outer circumferential surface thereof comes into contact with the contact portion 49b and is held by the roller portion 49 in the state in which vertical movement is regulated (see FIG. 31).

Figure 32:
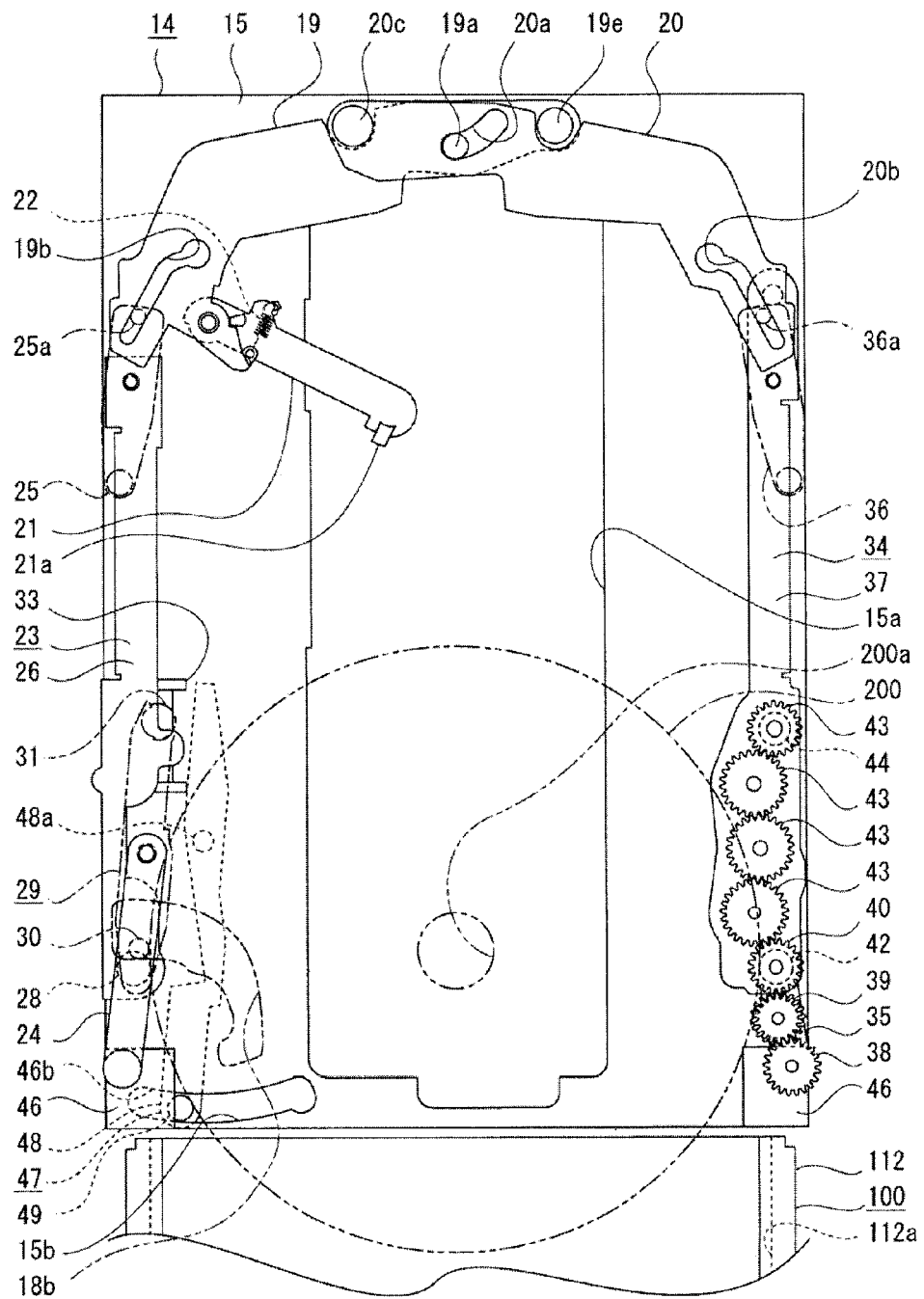
FIG. 32 is a schematic plane view illustrating a state in which a disk-like recording medium is continuously conveyed to a storage position, and a disk-like recording medium is held by a fixing roller, a driving roller, and a holding lever.

As the disk-like recording medium 200 is continuously conveyed in the front direction, the outer circumferential surface of the disk-like recording medium 200 comes into contact with the fixing roller 28 and the driving roller 42 and is separated from the pressing roller 31 and the rotary roller 44 (see FIG. 32). Thus, the disk-like recording medium 200 is conveyed in the front direction with the rotation of the driving roller 42. At this time, the outer circumferential surface of the disk-like recording medium 200 is pressed by the roller portion 49, and the holding lever 47 is pressed by the disk-like recording medium 200 and pivots against the urging force of the urging spring 50 so that the roller portion 49 moves left.

Figure 33:
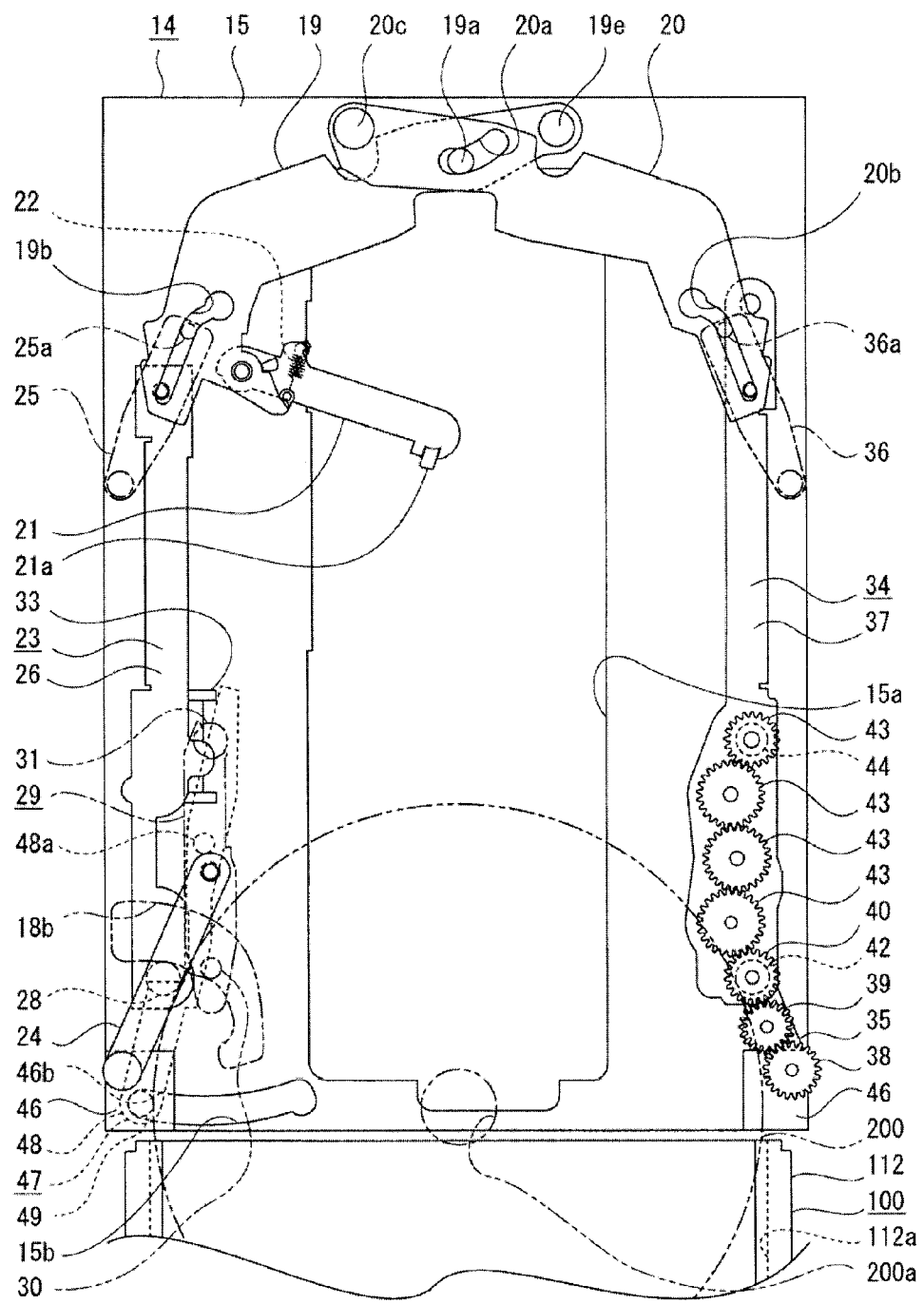
FIG. 33 is a schematic plane view illustrating a state in which a disk-like recording medium is continuously conveyed to a storage position, and a disk-like recording medium is inserted into a rear end portion of a holding groove in a disk cartridge.
Figure 34:
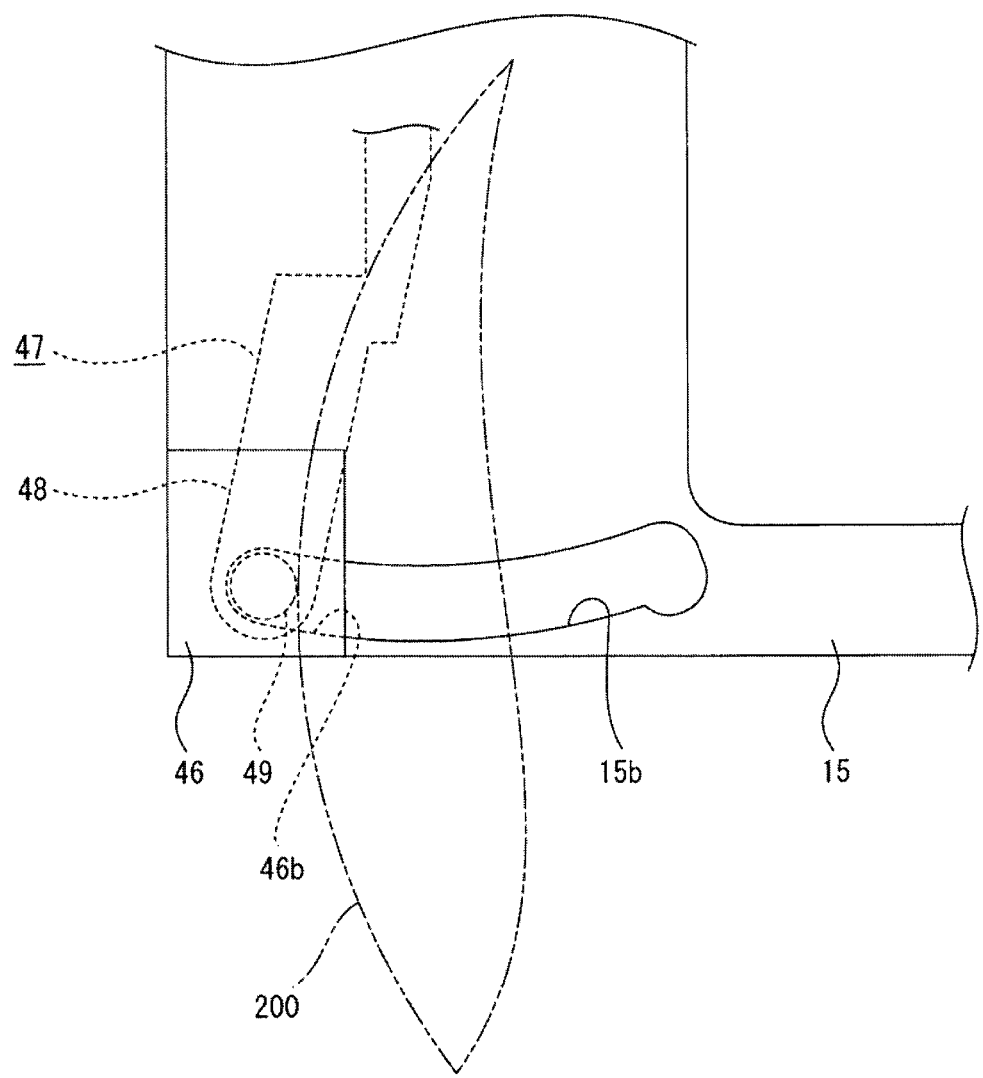
FIG. 34 is an enlarged plane view illustrating a state in which a roller portion is stored in a storage concave portion of a route guide.

As the disk-like recording medium 200 is further conveyed in the front direction, the holding lever 47 is further pressed by the disk-like recording medium 200 and pivots so that the roller portion 49 moves further left, and the outer circumferential surface of the disk-like recording medium 200 is inserted into the route guides 46 (see FIG. 33). The roller portion 49 of the holding lever 47 comes into contact with the outer circumferential surface of the disk-like recording medium 200 in the state in which the outer circumferential surface of the disk-like recording medium 200 is inserted into and stored in the storage concave portion 46b of the route guide 46 (see FIG. 34).

In the state in which the outer circumferential portion is inserted into the route guides 46, the disk-like recording medium 200 is held by the fixing roller 28, the driving roller 42, and the roller portion 49, and inserted into the rear end portion of the holding grooves 112a of the case body 101 in the disk cartridge 100. At this time, in the state in which the outer circumferential portion is inserted into the route guides 46, the disk-like recording medium 200 is held by the fixing roller 28, the driving roller 42, and the roller portion 49 and conveyed in the horizontal state without being inclined.

Figure 35:
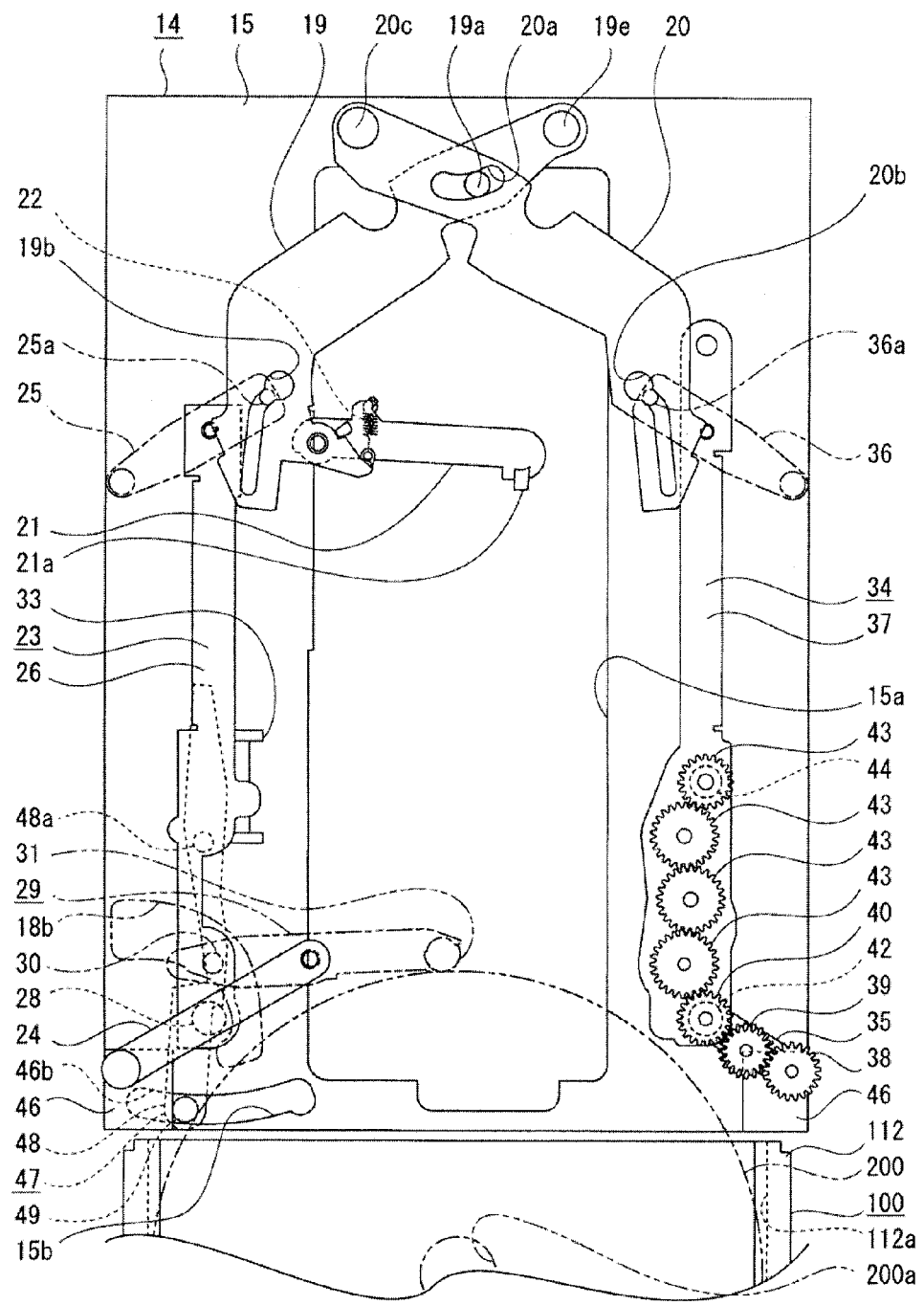
FIG. 35 is a schematic plane view illustrating a state in which a discharge lever pivots, and a disk-like recording medium is pressed by a pressing roller and conveyed toward to a storage position.

As the disk-like recording medium 200 is further conveyed in the front direction, the center of the disk-like recording medium 200 is positioned at the front side further than the roller portion 49, and thus the holding lever 47 pivots so that the roller portion 49 moves in approximately the right direction in the state in which the roller portion 49 is pressed by the outer circumferential surface of the disk-like recording medium 200 by the urging force of the urging spring 50 (see FIG. 35). At this time, the outer circumferential portion of the disk-like recording medium 200 is inserted into the inner side of the holding grooves 112a in the disk cartridge 100, and the disk-like recording medium 200 is separated from the driving roller 42. At this time, the outer circumferential surface of the disk-like recording medium 200 is separated from the pressing roller 31.

When the disk-like recording medium 200 is conveyed in the front direction, the first rail 26 and the second rail 37 move toward each other in parallel as the disk-like recording medium 200 is discharged from the disk conveying device 1, and the first front link arm 24, the first back link arm 25, the second front link arm 35, and the second back link arm 36 also pivot inward.

At this time, the discharge lever 29 also pivots inward as the first front link arm 24 pivots, and the pressing roller 31 protrudes rightward from the storage 33. When the discharge lever 29 pivots as the first rail 26 moves in the front direction, the cam engaging portion 30 slides along the cam hole 18b formed in the base chassis 18.

As the first rail 26 moves in the front direction, the discharge lever 29 largely pivots to move in approximately the front direction, and the pressing roller 31 of the discharge lever 29 comes in contact with the outer circumferential surface of the disk-like recording medium 200 again in the back direction. The discharge lever 29 continuously pivots, and the disk-like recording medium 200 is pressed by the pressing roller 31 to be conveyed in the front direction. At this time, the outer circumferential portion of the disk-like recording medium 200 is held at three points by the holding grooves 112a and the roller portion 49, and the disk-like recording medium 200 is converted in the horizontal state without being inclined.

Figure 36:
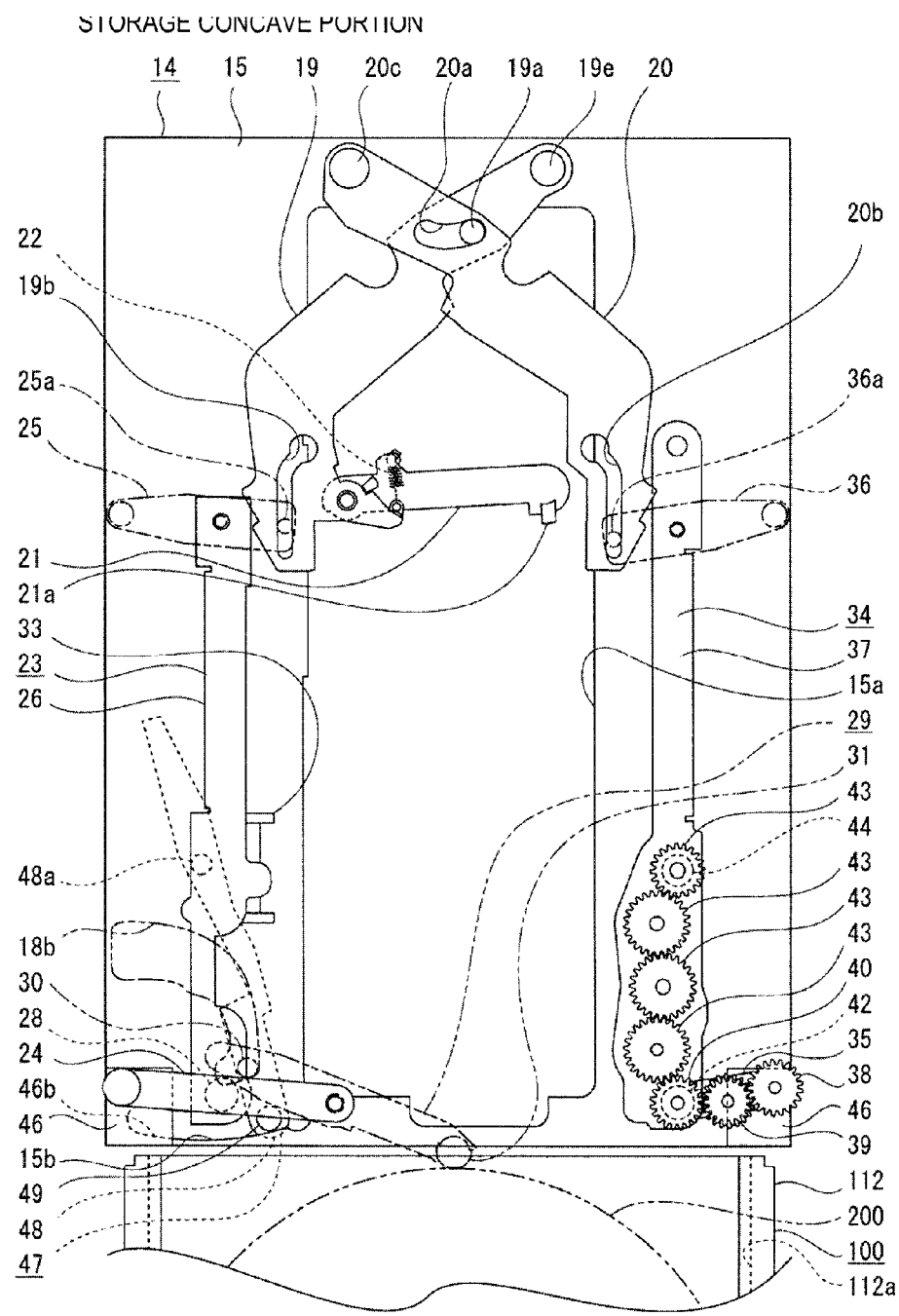
FIG. 36 is a schematic plane view illustrating a state in which a disk-like recording medium is conveyed to a storage position.

As the discharge lever 29 slides along the cam hole 18b of the cam engaging portion 30, the pressing roller 31 pivots on the cam engaging portion 30 so that the pressing roller 31 moves in approximately the front direction with respect to the first front link arm 24, and the pressing roller 31 is inserted into the disk cartridge 100 (see FIG. 36). At this time, the outer circumferential portion of the disk-like recording medium 200 is separated from the roller portion 49.

As the pressing roller 31 is inserted into the disk cartridge 100, the disk-like recording medium 200 is conveyed up to the storage position, and the entire disk-like recording medium 200 is stored in the disk cartridge 100.

When the entire disk-like recording medium 200 is stored in the disk cartridge 100, the drive motor rotates in the direction opposite to the rotation direction in the ejection operation, and the respective components return to the initial state by the operation reverse to the operation of storing the disk-like recording medium 200 in the disk cartridge 100. When the respective components return to the initial state, the rotation of the drive motor stops by the detection operation of the sensor.

When the drive motor rotates in the direction opposite to the rotation direction in the ejection operation and the respective components return to the initial state, the discharge lever 29 pivots, and so the pressing roller 31 is separated from the disk-like recording medium 200 in the back direction and extracted from the disk cartridge 100.

CONCLUSION

As described above, in the disk conveying device 1, the disk-like recording medium 200 is conveyed between the storage position at which the disk-like recording medium 200 is stored in the disk cartridge 100 and the recording and reproduction position at which the recording or reproduction of the information signal is performed on the disk-like recording medium 200 extracted from the disk cartridge 100, and the holding lever 47 that holds the disk-like recording medium 200 and regulates an inclination of the disk-like recording medium 200 in the thickness direction at least when the disk-like recording medium 200 is conveyed from the recording and reproduction position to the storage position is provided.

Thus, when the disk-like recording medium 200 is stored in the disk cartridge 100, the disk-like recording medium 200 to be stored is prevented from coming in contact with the disk-like recording medium 200 previously stored in the disk cartridge 100, and thus it is possible to prevent the disk-like recording medium 200 from being scratched and damaged.

Further, since an inclination of the disk-like recording medium 200 in the thickness direction is controlled, the disk-like recording medium 200 is held in the horizontal state when the disk-like recording medium 200 is stored in the disk cartridge 100, and the disk-like recording medium 200 to be stored is unlikely to come into slide contact with the opening edge of the holding grooves 112a, and thus it is possible to prevent the disk-like recording medium 200 from being scratched and damaged.

Further, since the urging spring 50 that urges the holding lever 47 to press the outer circumferential surface of the disk-like recording medium 200 is provided, when the disk-like recording medium 200 is conveyed, the roller portion 49 of the holding lever 47 comes into close contact with the outer circumferential surface of the disk-like recording medium 200, and thus it is possible to hold the disk-like recording medium 200 in the stable state through the holding lever 47.

Further, the holding lever 47 is configured to pivot in a plane perpendicular to the thickness direction of the disk-like recording medium 200, and pivots according to the conveyance position of the disk-like recording medium 200 in the state in which the holding lever 47 presses the outer circumferential surface of the disk-like recording medium 200.

Thus, a load greater than necessary is not applied to the disk-like recording medium 200, and it is possible to hold and convey the disk-like recording medium 200 in the stable state.

Further, the holding lever 47 is provided with the arm portion 48 and the roller portion 49 that is supported on one end portion of the arm portion 48 and comes into contact with the outer circumferential surface of the disk-like recording medium 200.

Thus, when the disk-like recording medium 200 is conveyed, the roller portion 49 presses the disk-like recording medium 200 while rotating, and thus it is possible to reduce a load on the disk-like recording medium 200.

In addition, in the holding lever 47, the flange portions 49a are formed on both ends portions of the roller portion 49 in the axial direction, and the portion between the flange portions 49a is formed as the contact portion 49b of the cylindrical shape that comes into contact with the outer circumferential surface of the disk-like recording medium 200.

Thus, since the flange portions 49a are positioned at both sides of the disk-like recording medium 200 in the thickness direction, displacement of the outer circumferential portion of the disk-like recording medium 200 caused by plane deviation is regulated, and thus it is possible to hold and convey the disk-like recording medium 200 in the stable state.

Furthermore, the storage concave portion 46b is stored in the route guide 46, and when the disk-like recording medium 200 is guided to the route guides 46, the holding lever 47 is partially stored in the storage concave portion 46b of the route guide 46.

Thus, since the route guide 46 does not interfere with the holding lever 47, it is possible to stably convey the disk-like recording medium 200, and a total arrangement space of the route guide 46 and the holding lever 47 is reduced, and thus the size of the disk conveying device 1 can be reduced.

It should be understood by those skilled in the art that various modifications, combinations, sub-combinations and alterations may occur depending on design requirements and other factors insofar as they are within the scope of the appended claims or the equivalents thereof.

[The Present Technology]

Additionally, the present technology may also be configured as below.

(1)
A disk conveying device including:
a conveying mechanism configured to convey a disk-like recording medium inside and outside a disk cartridge including a plurality of holding grooves into which both end portions of the disk-like recording medium positioned at opposite sides with a center hole interposed therebetween are inserted, the plurality of holding grooves being formed in a line in a thickness direction of the disk-like recording medium; and
a discharge lever configured to press an outer circumferential surface of the disk-like recording medium to the disk cartridge side when the disk-like recording medium is conveyed by the conveying mechanism,
wherein the disk-like recording medium is conveyed between a storage position at which the both end portions are inserted into the holding groove and the disk-like recording medium is stored in the disk cartridge and a recording and reproduction position at which recording or reproduction of an information signal is performed on the disk-like recording medium extracted from the disk cartridge, and
wherein at least a holding lever is provided, the holding lever being configured to come into contact with an outer circumferential portion of the disk-like recording medium, hold the disk-like recording medium, and regulate an inclination of the disk-like recording medium in the thickness direction of the disk-like recording medium when the disk-like recording medium is conveyed from the recording and reproduction position to the storage position.

(2)
The disk conveying device according to (1), further including:
an urging spring configured to urge the holding lever to press the outer circumferential portion of the disk-like recording medium.

(3)
The disk conveying device according to (2),
wherein the holding lever is configured to pivot in a plane perpendicular to the thickness direction of the disk-like recording medium, and
wherein the holding lever pivots according to a conveyance position of the disk-like recording medium in a state in which the holding lever presses the outer circumferential surface of the disk-like recording medium.

(4)
The disk conveying device according to any one of (1) to (3),
wherein the holding lever is provided with an arm portion and a roller portion configured to be rotatably supported on one end portion of the arm portion and come into contact with the outer circumferential portion of the disk-like recording medium.

(5)
The disk conveying device according to (4),
wherein flange portions are provided on both end portions of the roller portion in an axial direction, and
wherein a portion between the flange portions is provided as a contact portion having a cylindrical shape that comes into contact with the outer circumferential surface of the disk-like recording medium.

(6)
The disk conveying device according to any one of (1) to (5), further including:
a route guide configured to guide the disk-like recording medium whose outer circumferential portion is inserted into the route guide at a time of conveyance,
wherein a storage concave portion is formed in the route guide, and
wherein, when the disk-like recording medium is guided to the route guide, at least a part of the holding lever is stored in the storage concave portion.

What is claimed is:
1. A disk conveying device comprising:
a conveying mechanism configured to convey a disk recording medium inside and outside a disk cartridge including a plurality of holding grooves into which both end portions of the disk recording medium positioned at opposite sides with a center hole interposed therebetween are inserted, the plurality of holding grooves being formed in a line in a thickness direction of the disk recording medium; and
a discharge lever configured to press an outer circumferential surface of the disk recording medium to the disk cartridge side when the disk recording medium is conveyed by the conveying mechanism,
wherein the disk recording medium is conveyed between a storage position at which the both end portions are inserted into the holding groove and the disk recording medium is stored in the disk cartridge and a recording and reproduction position at which recording or reproduction of an information signal is performed on the disk recording medium extracted from the disk cartridge, and
wherein at least a holding lever is provided, the holding lever being configured to come into contact with an outer circumferential portion of the disk recording medium, hold the disk recording medium, and regulate an inclination of the disk recording medium in the thickness direction of the disk recording medium when the disk recording medium is conveyed from the recording and reproduction position to the storage position.

2. The disk conveying device according to claim 1, further comprising:
an urging spring configured to urge the holding lever to press the outer circumferential portion of the disk recording medium.

3. The disk conveying device according to claim 2,
wherein the holding lever is configured to pivot in a plane perpendicular to the thickness direction of the disk recording medium, and
wherein the holding lever pivots according to a conveyance position of the disk recording medium in a state in which the holding lever presses the outer circumferential surface of the disk recording medium.

4. The disk conveying device according to claim 1,
wherein the holding lever is provided with an arm portion and a roller portion configured to be rotatably supported on one end portion of the arm portion and come into contact with the outer circumferential portion of the disk recording medium.

5. The disk conveying device according to claim 4,
wherein flange portions are provided on both end portions of the roller portion in an axial direction, and
wherein a portion between the flange portions is provided as a contact portion having a cylindrical shape that comes into contact with the outer circumferential surface of the disk recording medium.

6. The disk conveying device according to claim 1, further comprising:
a route guide configured to guide the disk recording medium whose outer circumferential portion is inserted into the route guide at a time of conveyance,
wherein a storage concave portion is formed in the route guide, and
wherein, when the disk recording medium is guided to the route guide, at least a part of the holding lever is stored in the storage concave portion.

\* \* \* \* \*